(12) United States Patent
Salvagione et al.

(10) Patent No.: US 8,016,487 B2
(45) Date of Patent: Sep. 13, 2011

(54) WALKING BEARING SYSTEMS STRUCTURES AND PROCESSES

(75) Inventors: Paolo Salvagione, San Francisco, CA (US); Gregory Staples, Bolinas, CA (US)

(73) Assignee: The Long Now Foundation, San Francisco, CA (US)

( * ) Notice: Subject to any disclaimer, the term of this patent is extended or adjusted under 35 U.S.C. 154(b) by 431 days.

(21) Appl. No.: 12/355,897

(22) Filed: Jan. 19, 2009

(65) Prior Publication Data
US 2009/0297080 A1 Dec. 3, 2009

Related U.S. Application Data

(60) Provisional application No. 61/056,866, filed on May 29, 2008.

(51) Int. Cl.
*F16C 19/50* (2006.01)
*F16C 32/00* (2006.01)

(52) U.S. Cl. ............. 384/91; 384/549; 384/627; 384/7; 188/83

(58) Field of Classification Search .................. 384/2–7, 384/91, 154–156, 549, 627; 188/82.1, 82.8, 188/83
See application file for complete search history.

(56) References Cited

U.S. PATENT DOCUMENTS

| 4,444,442 A * | 4/1984 | Hojo et al. ........................ 384/2 |
| 5,752,774 A * | 5/1998 | Heshmat et al. .............. 384/549 |

* cited by examiner

*Primary Examiner* — Thomas R Hannon
(74) *Attorney, Agent, or Firm* — Michael A. Glenn; Glenn Patent Group

(57) ABSTRACT

A bearing system comprises a support member and a rotational element having a generally cylindrical bearing surface, and a plurality of detents defined upon and extending in from the cylindrical bearing surface, and may include means for rotating the rotational element in relation to the support member. The bearing system also comprises at least three bearing assemblies, each comprising a cam member rotatably mounted to the support member. Each of the cam members comprises a cam surface having a profile that contacts the cylindrical bearing surface and rotates away from a home position when the cam is rotatably positioned to meet one of the bearing regions, and does not contact the cylindrical bearing surface when the cam is rotatably positioned to meet one of the detent regions. Each of the cam members are rotationally biased toward their home position.

30 Claims, 17 Drawing Sheets

WALKING BEARING SYSTEMS STRUCTURES AND PROCESSES

CROSS REFERENCE TO RELATED APPLICATION

This Application claims priority to U.S. Provisional Application No. 61/056,866, entitled Walking Bearing, filed 29 May 2008.

The aforementioned document is incorporated herein in its entirety by this reference thereto.

FIELD OF THE INVENTION

The present invention relates generally to the field of bearing systems. More particularly, the present invention relates to bearing systems, structures, and processes for slowly moving loads.

BACKGROUND OF THE INVENTION

Bushings, such as comprising cylindrical metal sleeves, have historically been used to prevent abrasion between machine components, acting as a simple bearing or guide between components.

A wide variety of bearing structures have historically been used in machines to support either sliding or rotating parts, such as to reduce friction between machine components. For example, many bearing assemblies typically comprise a plurality of rotational bearing elements, e.g. ball bearings, roller bearings, tapered bearings or needle bearings, such as between a rotational element and a race, typically with the addition of a lubricant or grease.

However, such approaches have several shortcomings for many design environments, such as for systems having high loads and very low-speeds of relative movement between components.

In such an environment, conventional bearings may weld themselves shut, or wear grooves or divots at points of contact if they don't move for a long time, just from sitting, and/or from deflections or micro-vibrations in the mounts and the bearing elements, such as from nearby movement, e.g. people walking nearby, or trucks going by.

This is a common problem where, unless a conventional bearing is exercised regularly and is at least rotated approximately on the order of a revolution a day, such a bearing may push all grease out from between the contact points around the race and the bearing interface. Such a bearing structure may develop excess wear, e.g. divots, and/or if made of metal components, may eventually weld itself shut.

It would be advantageous to provide an improved, robust bearing system, structure and process for many design environments, such as for systems having high loads and/or very low-speeds or relative movement between components.

As well, it would be advantageous to provide a bearing system, structure and process to improve the longevity of slowly rotating or sliding structures. The development of such a structure would comprise a significant technological development.

SUMMARY OF THE INVENTION

An exemplary walking bearing structure comprises a support member and a rotational element having a generally cylindrical bearing surface, and a plurality of detents defined upon and extending in from the cylindrical bearing surface, wherein the generally cylindrical bearing surface comprises a plurality of bearing regions and a plurality of detent regions, and may include means for rotating the rotational structure in relation to the support member. The exemplary walking bearing structure also comprises at least three bearing assemblies, wherein each of the bearing assemblies comprises a cam member rotatably mounted to the support member, each of the cam members comprising a cam surface having a profile that contacts the cylindrical bearing surface and rotates away from a home position when the cam is rotatably positioned to meet one of the bearing regions of the cylindrical bearing surface, and does not contact the cylindrical bearing surface when the cam is rotatably positioned to meet one of the detent regions of the cylindrical bearing surface, and means for rotationally biasing the cam member toward the home position.

DETAILED DESCRIPTION OF PREFERRED EMBODIMENTS

Figure 1:
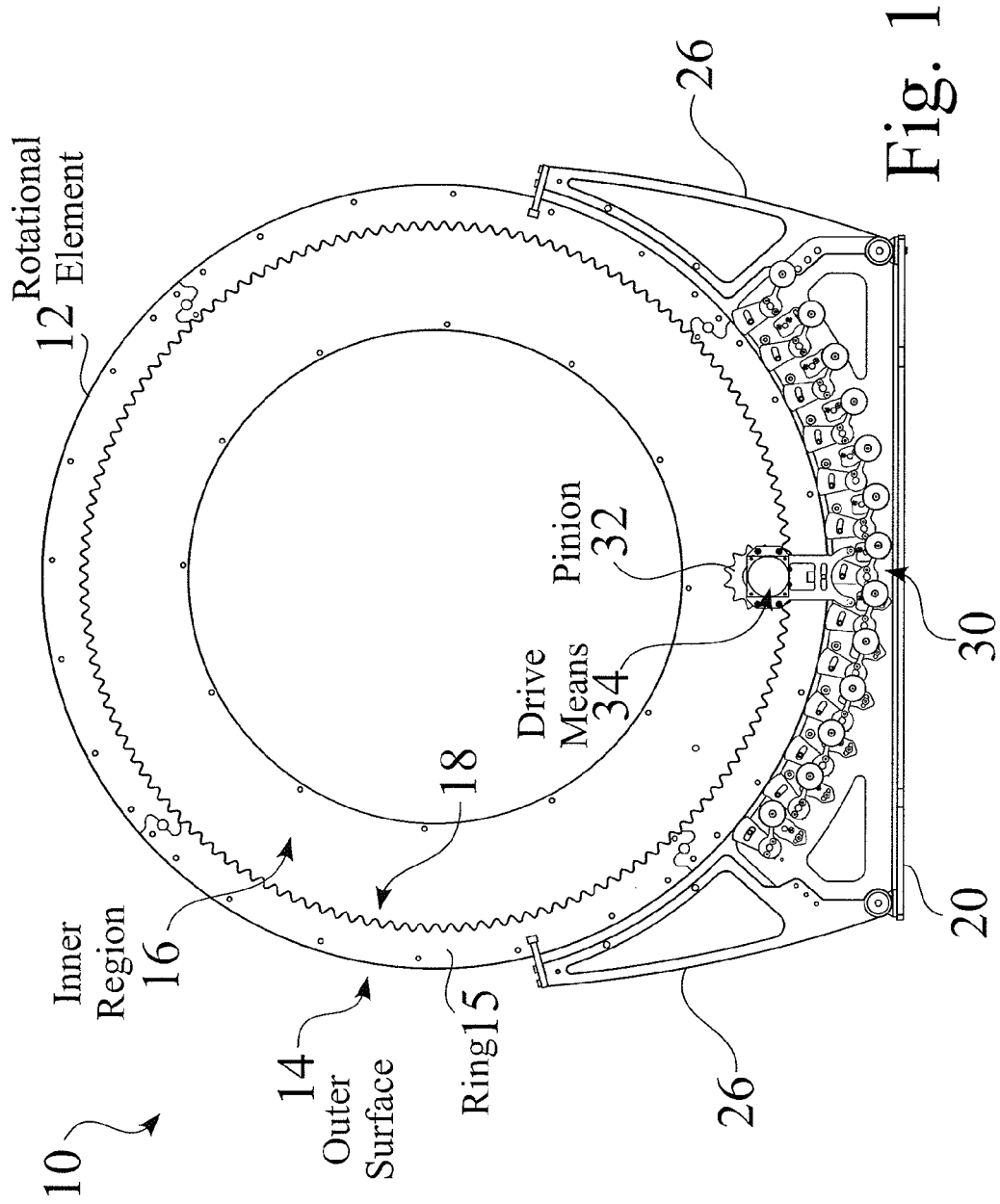
FIG. 1 is a front side view of an exemplary ring structure supported by an exemplary walking bearing system.

FIG. 1 is a front side view of an exemplary walking bearing system 10, comprising a bearing interface between a cascade array 30 of walking bearing assemblies 40, e.g. 40a-40z, and a rotational element 12, e.g. a ring 12.

Figure 2:
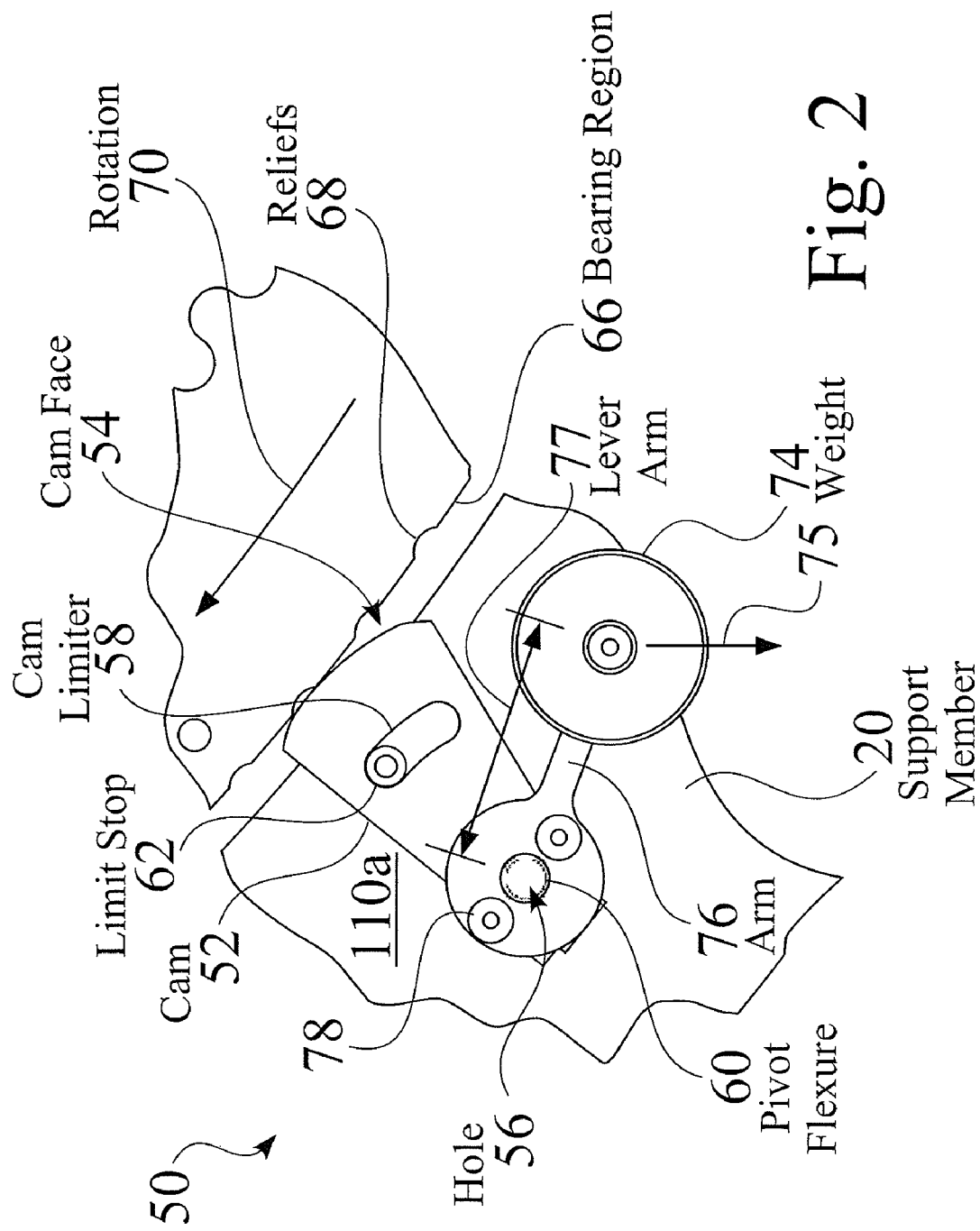
FIG. 2 shows a detailed side view of an exemplary walking bearing in a first home position.

The exemplary walking bearing system 10 supports relatively slowly turning loads with no continuously rotating parts. The weight of the rotating mass 12 is supported entirely by a phased array 30 of flexures 60, e.g. pivot flexures 60 (FIG. 4) that pass the load from one to the next to achieve rotation. Each cam 52 (FIG. 2) is allowed to return and re-catch the load 12 by a series of reliefs 68 (FIG. 2) cut or otherwise formed in the rotating element 12, and can be aided by a counterweight 74 (FIG. 2).

The exemplary walking bearing system 10 alleviates galling and welding problems, in contrast to ball or roller bearings associated with very slow turning systems, or for systems that turn only sporadically over the course of months or years. Materials for the cams and rotating element may preferably comprise any of engineered ceramics, stone, or hard coated metals, e.g. such as but not limited to diamond coatings.

The walking bearing system 10 also does not require as much accuracy or cleanliness in the main rotating element 12 to work, allowing for dust, slight out of round, or trueness problems that would normally cause conventional bearings, e.g. ball bearings, to seize.

The cascade 30 typically comprises three or more supportive walking bearing cam assemblies 40, e.g. 40a-40z, which contact and support the rotational element 12. In the exemplary structure 10 seen in FIG. 1, the rotational element 12 comprises a ring 15 having a ring gear 18 located on an inner ring surface 16, such that the ring 12 is driveably rotatable by a matching gear 32 and drive means 34.

For example, in the exemplary rotational element 12 seen in FIG. 1, a pinion drive gear 32 is linked to a drive motor 34. The drive gear 32 meshes with the teeth 18 on the rotational element 12, such that when the drive motor 34 is energized, such as continuously, intermittently, or periodically at low speed, the drive gear 32 drives the ring gear 18 to turn the rotational element 12.

While the rotational element 12 having a drive gear 18 shown in FIG. 1 is generally representative of a rotational structure 12, other embodiments of the rotational element 12 are not required to have gear teeth 18, and may be driven by any means 32,34.

Figure 3:
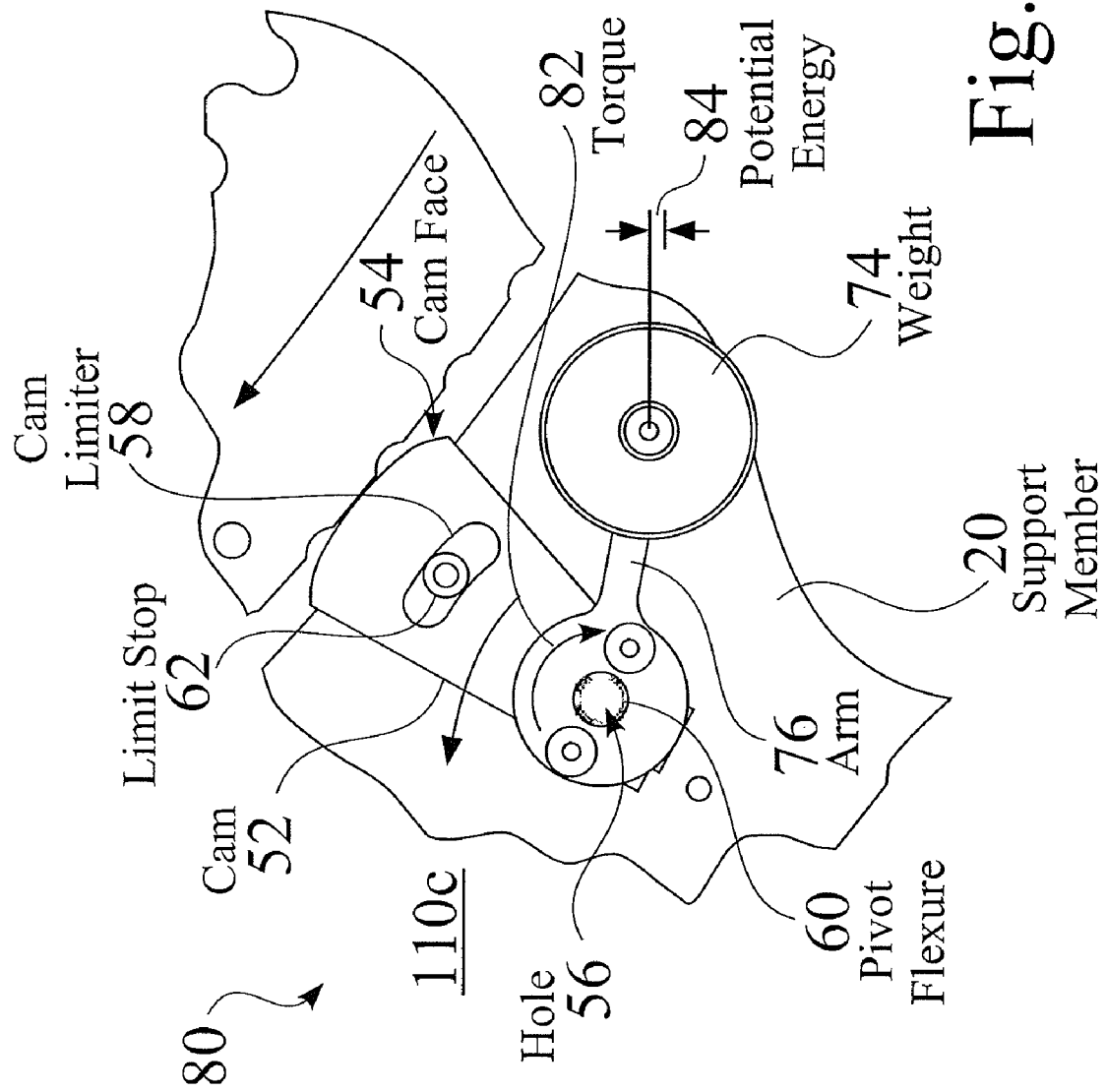
FIG. 3 is a detailed side view of an exemplary walking bearing in a second position.

The exemplary rotational element 12 seen in FIG. 1 has an outer surface 14 comprising a generally circular surface 14, upon which are defined a series of bearing return cutouts 68, as seen in more detail in FIG. 2 and FIG. 3. Between the bearing return cutouts 68, bearing regions 66 are defined upon the outer surface 14 of the rotational element 12, which come into contact with and are supported by the walking bearing members 40, e.g. 40a-40z.

In some system embodiments 10, the mating surface 54 (FIG. 4, FIG. 5) of the cams 52 (FIG. 4, FIG. 5) and/or the supported structure, e.g. the rotating member 12, may further comprise a rough mating surface 14, 66, such as to promote fixed rotational movement of the cams 52, i.e. to prevent sliding of the cams 52.

Support for the rotational element 12 is typically provided at any given time by at least two, and often times several, of the series of cams 52. Each of the cams 52 are rotationally mounted to a support structure 20, such as by a hole 56 (FIG. 2) defined through each cam 52. Each cam 52 also comprises a cam face 54 having a cam profile 102 (FIG. 4), wherein the central region 104 of the cam profile generally defines a fixed radius 112 (FIG. 4) from the center 56 of the cam 52. The central region 104 of the cam profile 102 contacts the bearing regions 66 of the outer surface 14 of the rotational element 12, to provide support for the rotational element 12.

Each of the cams 52 are rotationally mounted to the support structure 20 by any of a cam pivot 60 or cam bearing 60, which typically comprises a pivot flexure 60. In alternate embodiments of the walking bearing system, structure and process, the flexures 60 may alternately comprise butterfly flexures 60 or helical flexures 60.

In the exemplary embodiment 10 shown in FIG. 1, the cams 52 are preferably mounted to pivot flexures 60, such as available through C-Flex Bearing Co., Inc., of Frankfort, N.Y., which are in turn affixed to the support structure 20, such that the pivot flexures 60 provide a spring bias 124 (FIG. 5) for the mounted cams 52. During rotation of the rotational element 12, and subsequent rotational motion of the cams 52, the pivot flexures 60 are rotated 122 (FIG. 5) away from a home position 110a, and develop a restorative bias force 124 back toward the home position 110a. When the rotational element 12 rotates such that one of the return cutouts 68 becomes aligned 322 (FIG. 17, FIG. 18) to a corresponding cam 52, the corresponding cam 52 returns, i.e. snaps back, toward the home position 110a, as acted upon by the bias force 124 of the pivot flexure 60, such that the bearing cam 52 can contact the next approaching bearing region 66 of the rotational element 12.

As seen in the exemplary walking bearing assemblies 40 shown in FIG. 2 and FIG. 3, each one of the walking bearing assemblies 40 further comprises a counterweight 74 that extends 77 from a cam arm 76 that is affixed 72 to a corresponding cam 52. The counterweights 74 and their positions, as defined by the cam arms 76 and movement, may preferably provide restorative force 75 and torque 82 (FIG. 3), such as alone or in combination with bias force 122, to direct the cams 52 toward a respective home position 110b.

Figure 4:
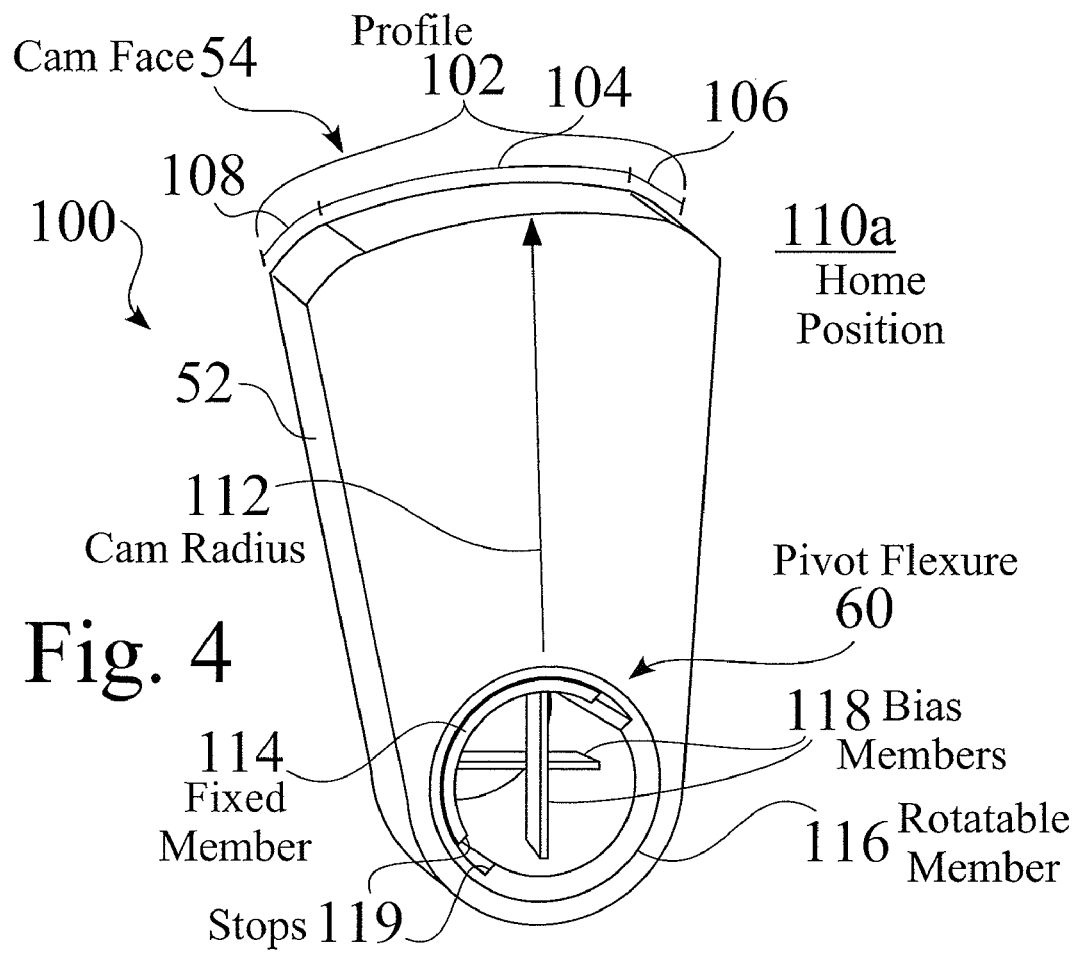
FIG. 4 is a partial perspective view of a cam for an exemplary walking bearing mounted to a pivot flexure, in a first resting home position.
Figure 5:
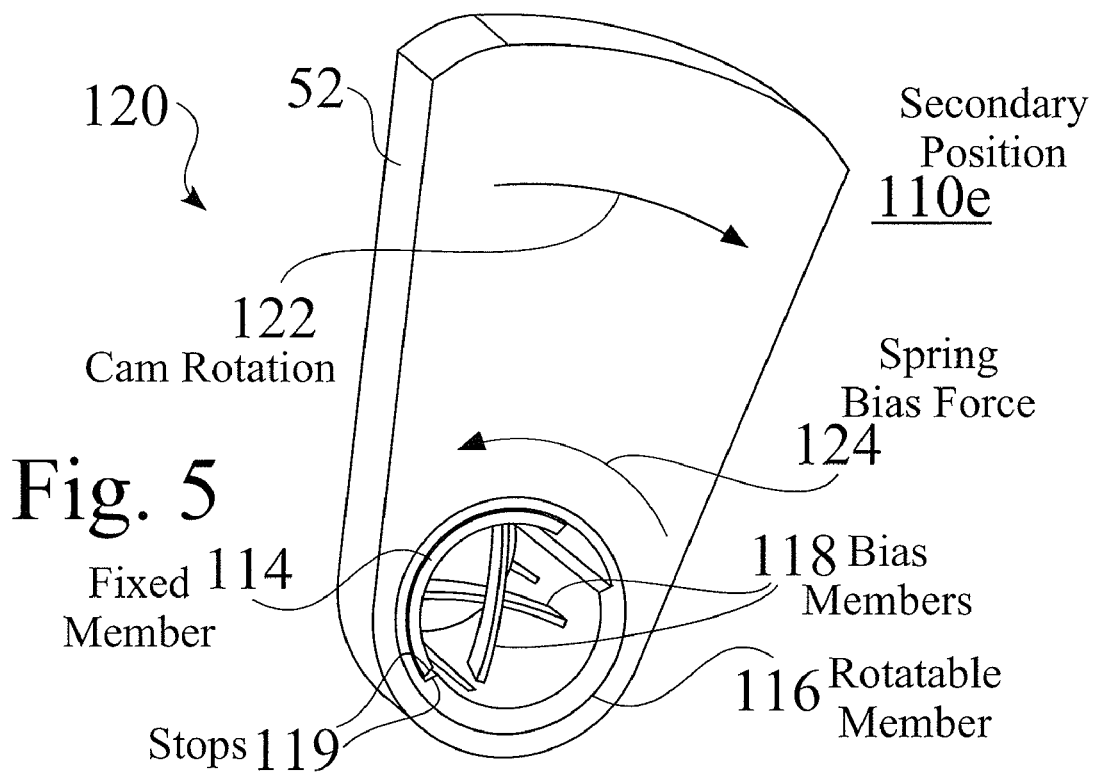
FIG. 5 is a partial perspective view of a cam for an exemplary walking bearing mounted to a pivot flexure, in a secondary position, wherein the pivot flexure has a rotational bias force toward the home position.

FIG. 4 is a partial perspective view 100 of a cam 52 for an exemplary walking bearing assembly 40, wherein the cam 52 is mounted to a flexible pivot flexure 60. In FIG. 4, the cam 52 and pivot flexure 60 are in a first resting home position 110a. FIG. 5 is a partial perspective view 120 of a cam 52 for an exemplary walking bearing assembly 40, wherein the cam 52 and pivot flexure 60 are in a secondary position 110, e.g. 110e, such that the pivot flexure 60 has a rotational bias force 124 toward the home position 110a.

The exemplary cam face 54 seen in FIG. 4 comprises an exemplary cam profile 102, such as ground, milled, or otherwise formed, to provide a central mating surface 104, a front leading edge profile 106, and a trailing edge profile 108, by which the cam 52 can:

rotate 122 (FIG. 5) during contact with a corresponding bearing surface 66 on the rotational element 12;

be freed from contact with the rotational element 12 at a relief region 68 to reset and return to a home position 110a, such as responsive to a spring bias force 124; and regain contact with an approaching bearing surface 66 on the rotational element 12.

The exemplary pivot flexure 60 seen in FIG. 4 and FIG. 5 includes opposing pivot flexure members, such as comprising a first member 114, which is typically fixed in relation to a support member 20 (FIG. 1), and a second member 116, which is typically affixed to the cam 52 and rotatable in relation to the fixed member 114. The pivot flexures 60 further comprise bias members 118, e.g. torsional spring steel members connected between the fixed members 114 and rotatable members 116, which provide the restorative spring bias force 124, when the members 114,116 are rotated with respect to each other.

Figure 6:
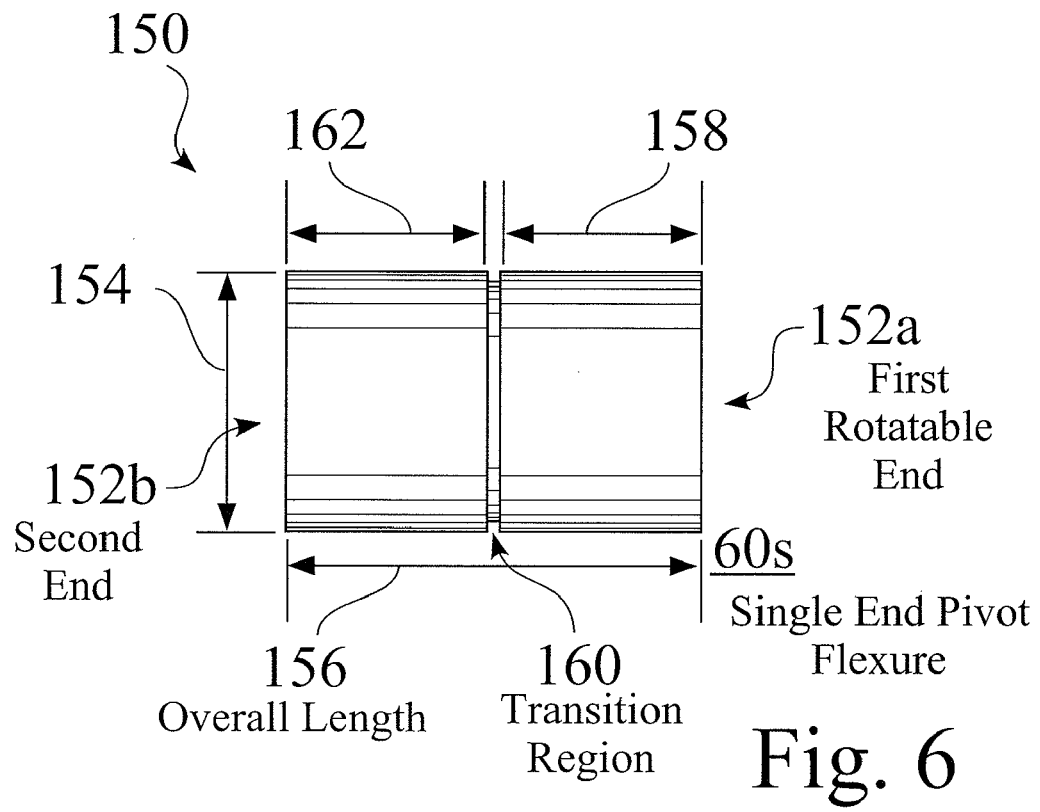
FIG. 6 is a side view of an exemplary single end c-flex pivot flexure structure.
Figures 7, 8:
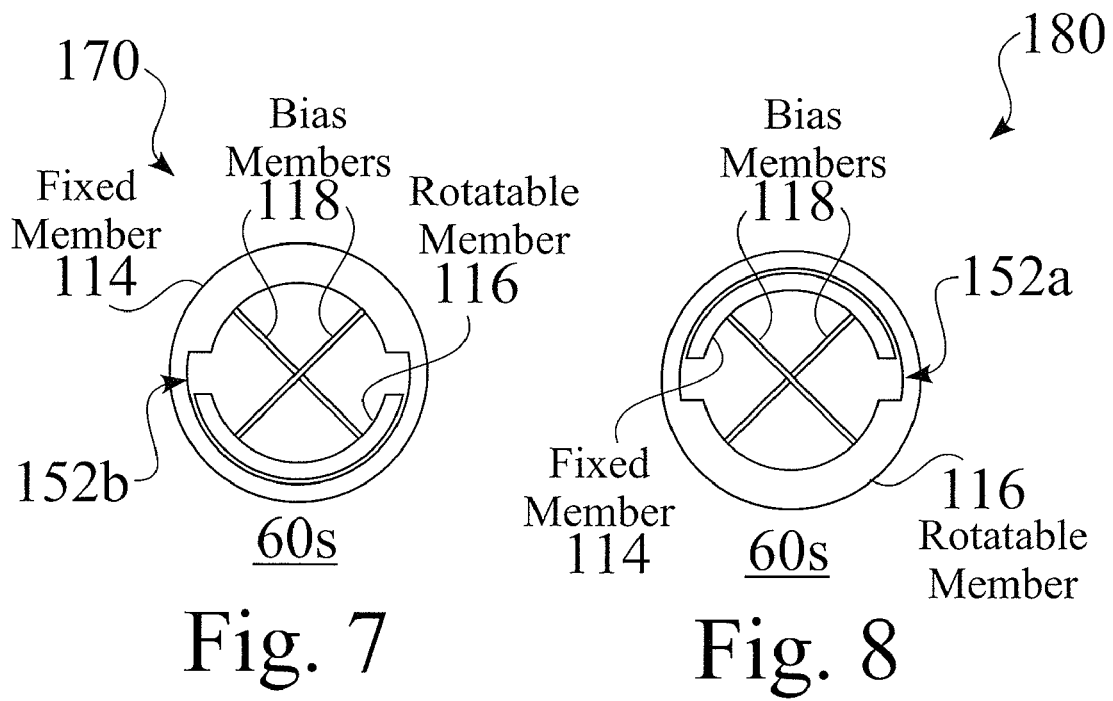
FIG. 7 is an end view of a first end of an exemplary single end c-flex pivot flexure structure.
FIG. 8 is an end view of a second end of an exemplary single end c-flex pivot flexure structure.

Pivot Bearing Structures. FIG. 6 is a schematic side view 150 of an exemplary single end pivot flexure structure 60, e.g. 60s. FIG. 7 is an end view 170 of a second end 152b of an exemplary single end pivot flexure structure 60s. FIG. 8 is an end view of a first end 152a of an exemplary single end pivot flexure structure 60s.

Figure 12:
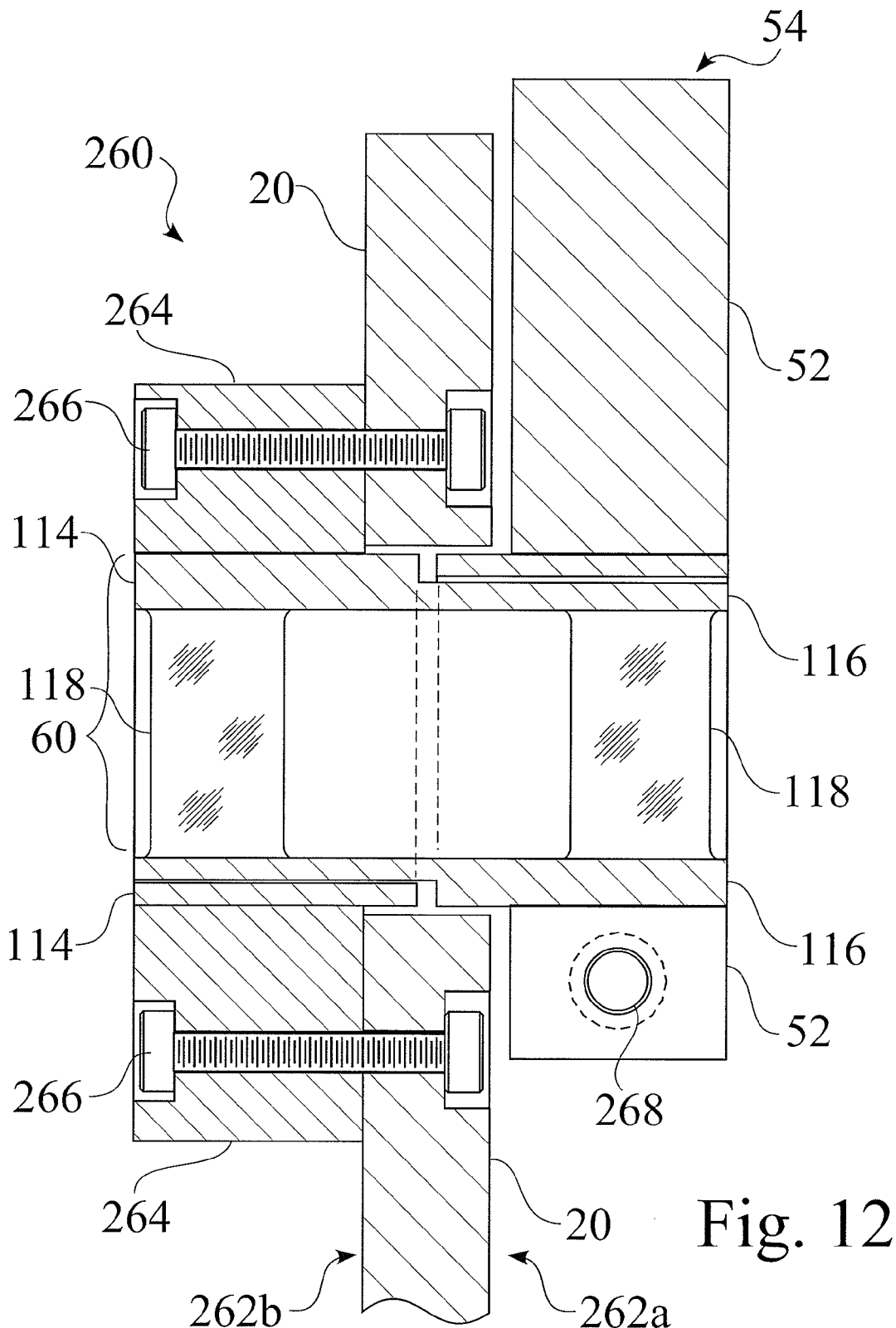
FIG. 12 is a detailed partial cutaway view of a bearing cam affixed to a single end c-flex pivot flexure that is affixed to a support structure.

The single end pivot flexure structure 60 seen in FIG. 6 is generally defined by a bearing diameter 154 and an overall length 156. The pivot flexure 60s comprises a fixed member 114 at a second end 152b, which may preferably be affixed to a walking bearing support structure 20, either directly or by a flexure mount 264 (FIG. 12). The single end pivot flexure 60s also comprises a rotatable member 116 at a first end 152a, which may preferably be affixed to a cam 52, wherein the cam attachment may be made by a wide variety of connection means 268 (FIG. 12), such as but not limited to any of a clamp screw, a set screw, a radial pin, an axial pin, a locator flat, or any combination thereof.

The length 156 of the single end pivot flexure 60s is generally defined by the length 158 of the rotatable member 116 at a first end 152a, the length 162 of the fixed member 114 at a second end 152a, and a length of a transition region 160 between the fixed member 114 and the rotatable member 116. As seen in FIG. 7 and FIG. 8, the single end pivot flexure 60s further comprises bias members 118 that connect the fixed member 114 to the rotatable member 116, and provide the bias force 122 for the pivot flexure 60s.

In the exemplary system embodiments 10 seen in FIG. 15 through FIG. 20, cascades 30, e.g. 30a,30b, of walking bearing assemblies 40, e.g. 40a-40z may be mounted on opposing surfaces 262a,262b (FIG. 12) of a support structure 20, to provide support for one or more rotating members 12.

Figure 9:
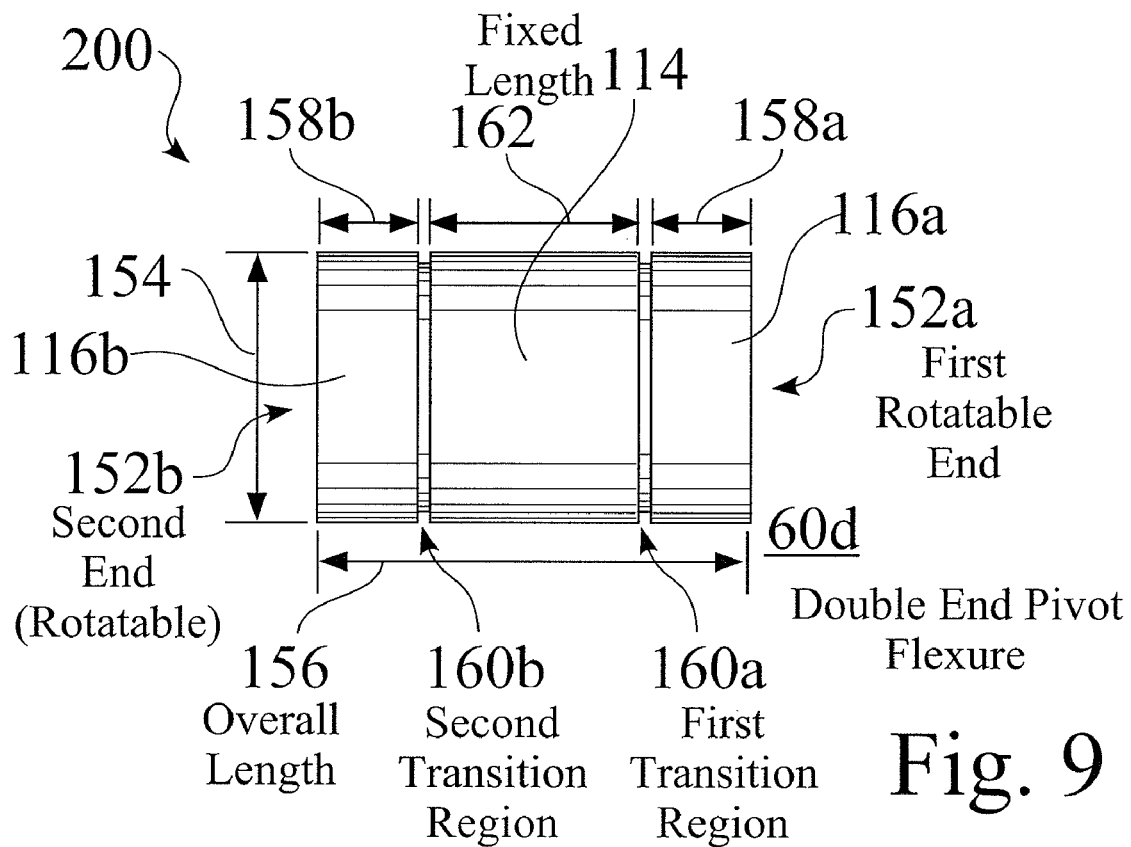
FIG. 9 is a side view of an exemplary double end c-flex pivot flexure structure.
Figures 10, 11:
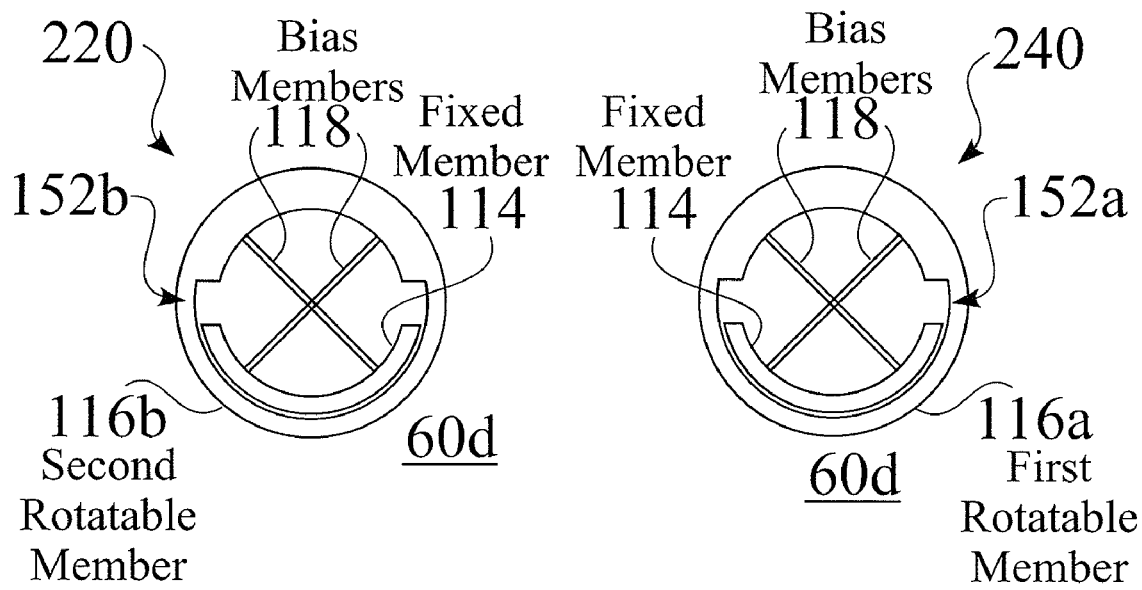
FIG. 10 is an end view of a first end of an exemplary double end c-flex pivot flexure structure.
FIG. 11 is an end view of a second end of an exemplary double end c-flex pivot flexure structure.

FIG. 9 is a side view 200 of an exemplary double end pivot flexure structure. FIG. 10 is an end view 220 of a second end 152b of an exemplary double end pivot flexure structure 60d. FIG. 11 is an end view 240 of a first end 152a of an exemplary double end pivot flexure structure 60d.

The double end pivot flexure structure 60d seen in FIG. 9 is similarly defined by a flexure diameter 154 and an overall length 156. The double end pivot flexure 60d comprises a fixed member 114 between a first end 152a and a second opposing end 152b, which may preferably be affixed to a walking bearing support structure 20, such as but not limited to any of a clamp screw, a set screw, a radial pin, an axial pin, a locator flat, or any combination thereof.

The double end pivot flexure 60d also comprises a first rotatable member 116a at the first end 152a and a second rotatable member 116b at the first end 152d, which may preferably be affixed to cams 52, wherein the cam attachments may be made by a wide variety of connection means 268 (FIG. 12), such as but not limited to any of a clamp screws, a set screws, radial pins, axial pins, locator flats, or any combination thereof.

The length 156 of the double end pivot flexure 60d is generally defined by the length 158a of the first rotatable member 116a at a first end 152a, the length 158b of the second rotatable member 116b at a first end 152b, the length 162 of the fixed member 114 between the first rotatable member 116a and second rotatable member 116b, and by the lengths of transition regions 160a,160b between the fixed member 114 and the rotatable members 116a,116b. As seen in FIG. 10 and FIG. 11, the double end pivot flexure 60d further comprises bias members 118 that connect the fixed member 114 to the rotatable members 116a,116b, and provide the bias force 124 for the pivot flexure 60s on opposing sides, such as for cams 54 within walking bearing cascades 30 located on opposing sides of a support member 20.

Exemplary Pivot Flexure Structures for Walking Bearing Systems. FIG. 12 is a detailed partial cutaway view 260 of a bearing cam 52 affixed to a pivot flexure 60, e.g. a single end pivot flexure 60s, which is affixed 264,266 to a support structure 20. As seen in FIG. 12, the pivot flexure 12 is mounted in the support structure 20, wherein the face 54 of the cam 52 contacts the outer surface 14 of a rotatable element 12, such as within bearing regions 66 (FIG. 2).

Figure 13:
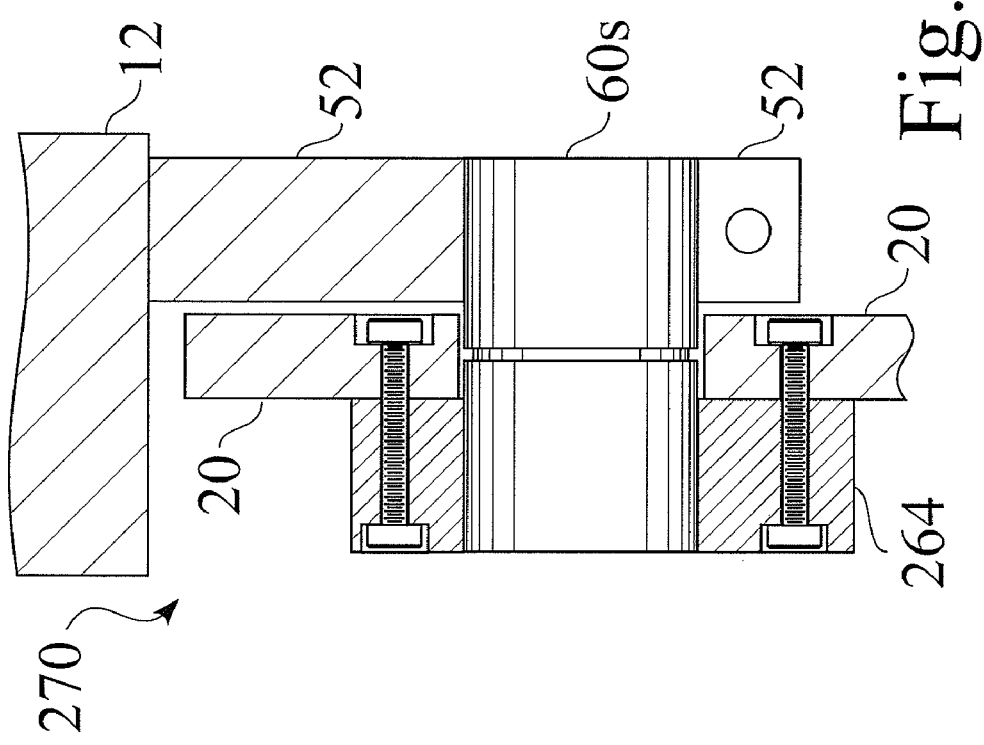
FIG. 13 is a detailed partial cutaway view of a bearing cam affixed to a single end c-flex pivot flexure and in contact with a rotating member.

FIG. 13 is a detailed partial cutaway view 270 of a bearing cam 52 affixed to a single end pivot flexure 60s and in contact with a rotational element 12. As the rotational element 12 is rotated, the cams 52 rotate within a defined range of motion of the pivot flexures 60 when in contact with the bearing regions 66 of the rotational element 12. The defined reliefs 68 periodically become aligned with one or more of the cams within a cascade 30, wherein the aligned cams 52 reset, i.e. return, toward a home position 110a, such as under the bias force 122 of the pivot flexures, and/or from stored potential energy 84 supplied by the relative position of the cam weights 74 (FIG. 3).

Figure 14:
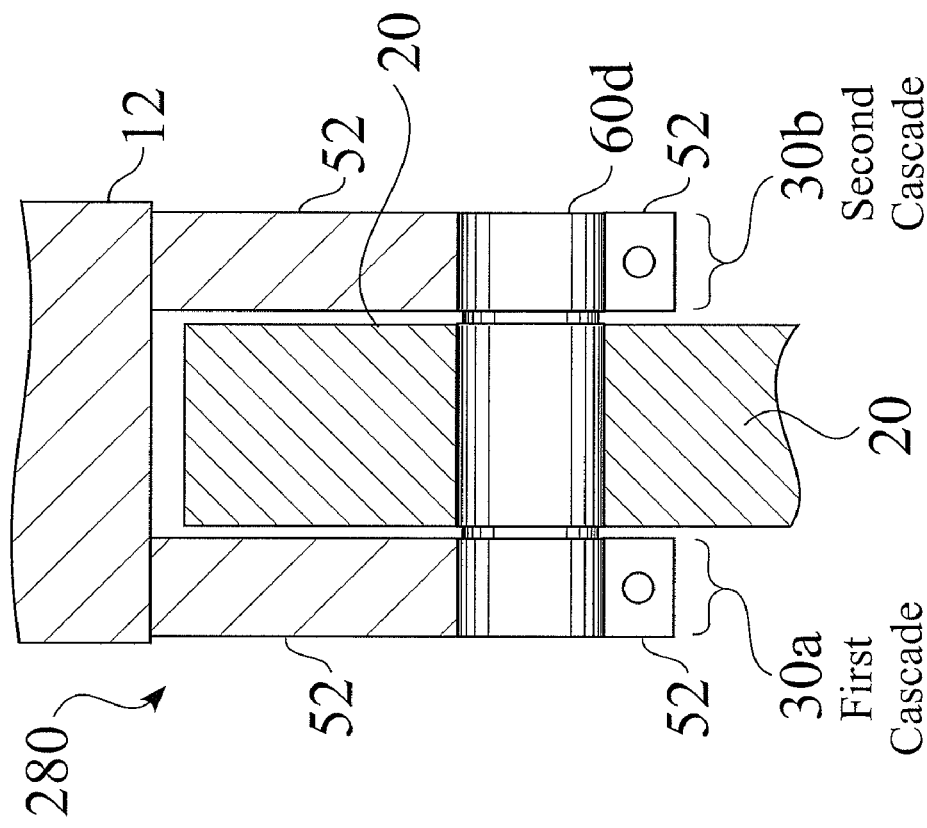
FIG. 14 is a detailed partial cutaway view of a plurality of bearing cams affixed to a c-flex pivot flexure and in contact with a rotating member.

FIG. 14 is a detailed partial cutaway view 280 of opposing bearing cams 52 affixed to a pivot flexure 60, e.g. a double end pivot flexure 60d, and in contact with a rotational element 12. The opposing bearing cams 52 in FIG. 14 are members of a plurality of bearing cascades 30, e.g. 30a,30b, that are mounted to a support member 20, such as to support one or more rotational elements 12. The bearing cascades 30 may synchronized with each other, or may operate out of phase with each other. As well the defined reliefs 68 in the rotational element 12 may extend through the rotational element 12, or may define a different series or offset between opposing sides of the rotational element 12.

Exemplary Operation of Walking Bearing System. FIGS. 15 through 20 show partial detailed views of a series of sequential positions for an exemplary embodiment of a walking bearing structure 10.

Figure 15:
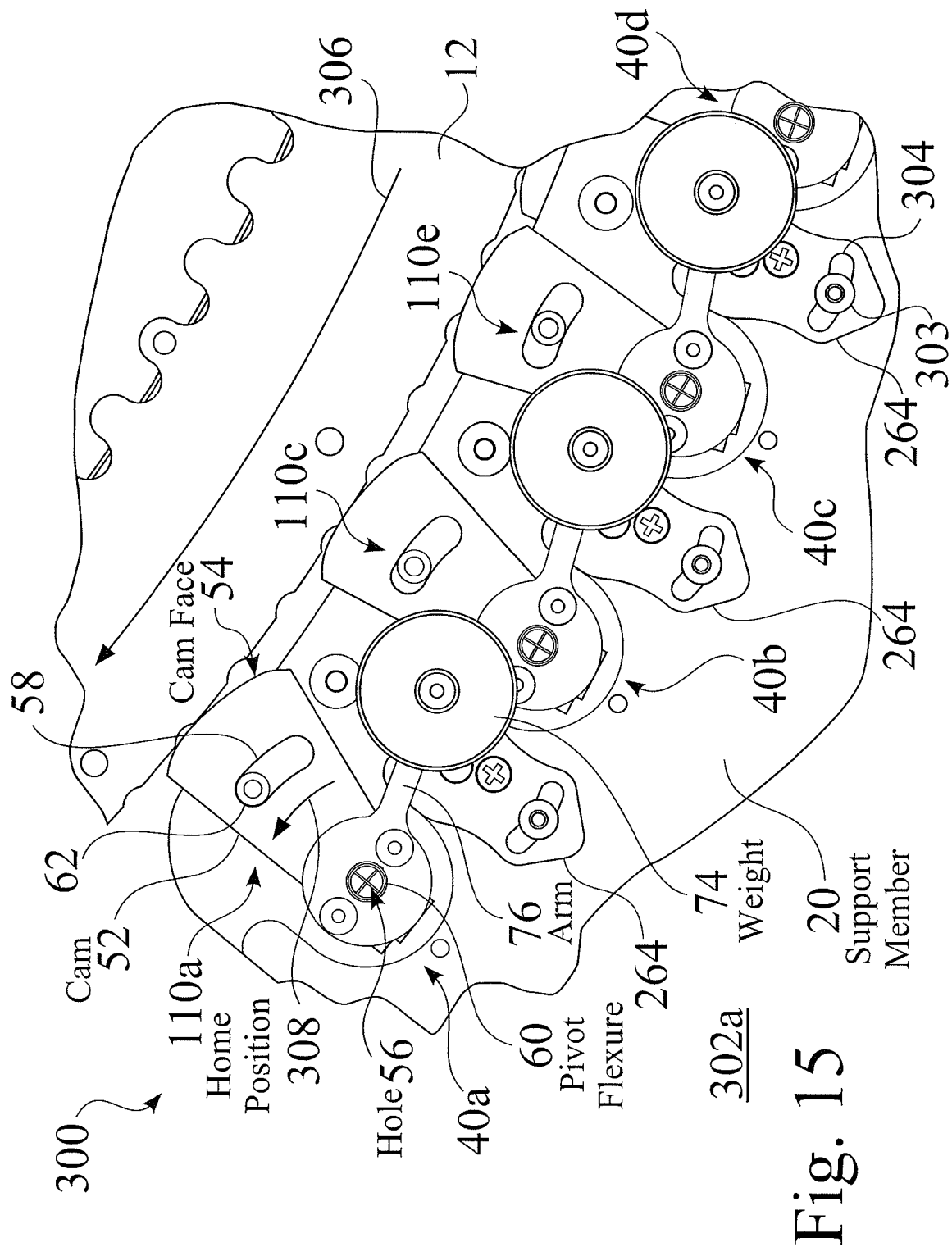
FIG. 15 is a partial view of an exemplary walking bearing system in a first sequential position.
Figure 16:
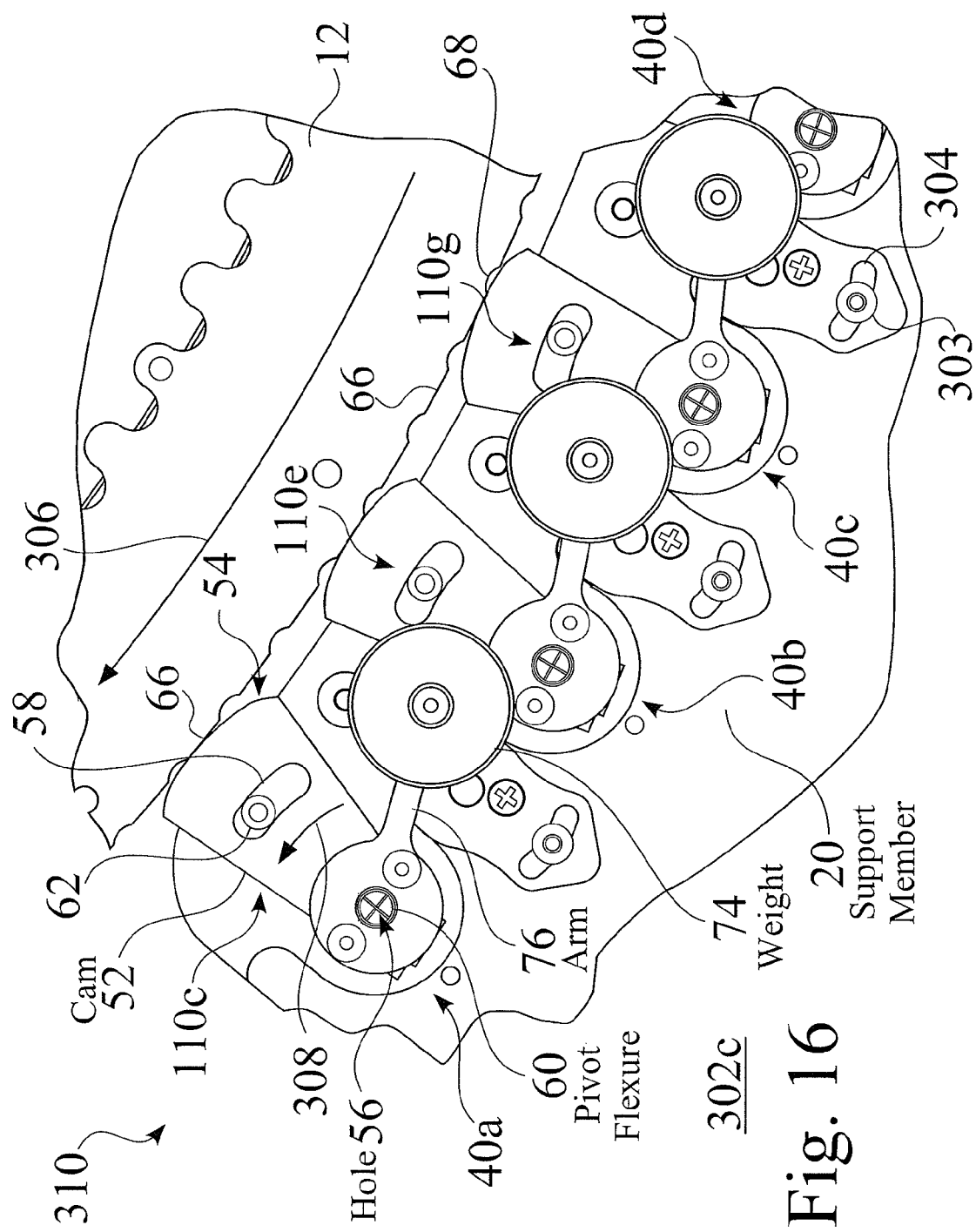
FIG. 16 is a partial view of an exemplary walking bearing system in a second sequential position.
Figure 17:
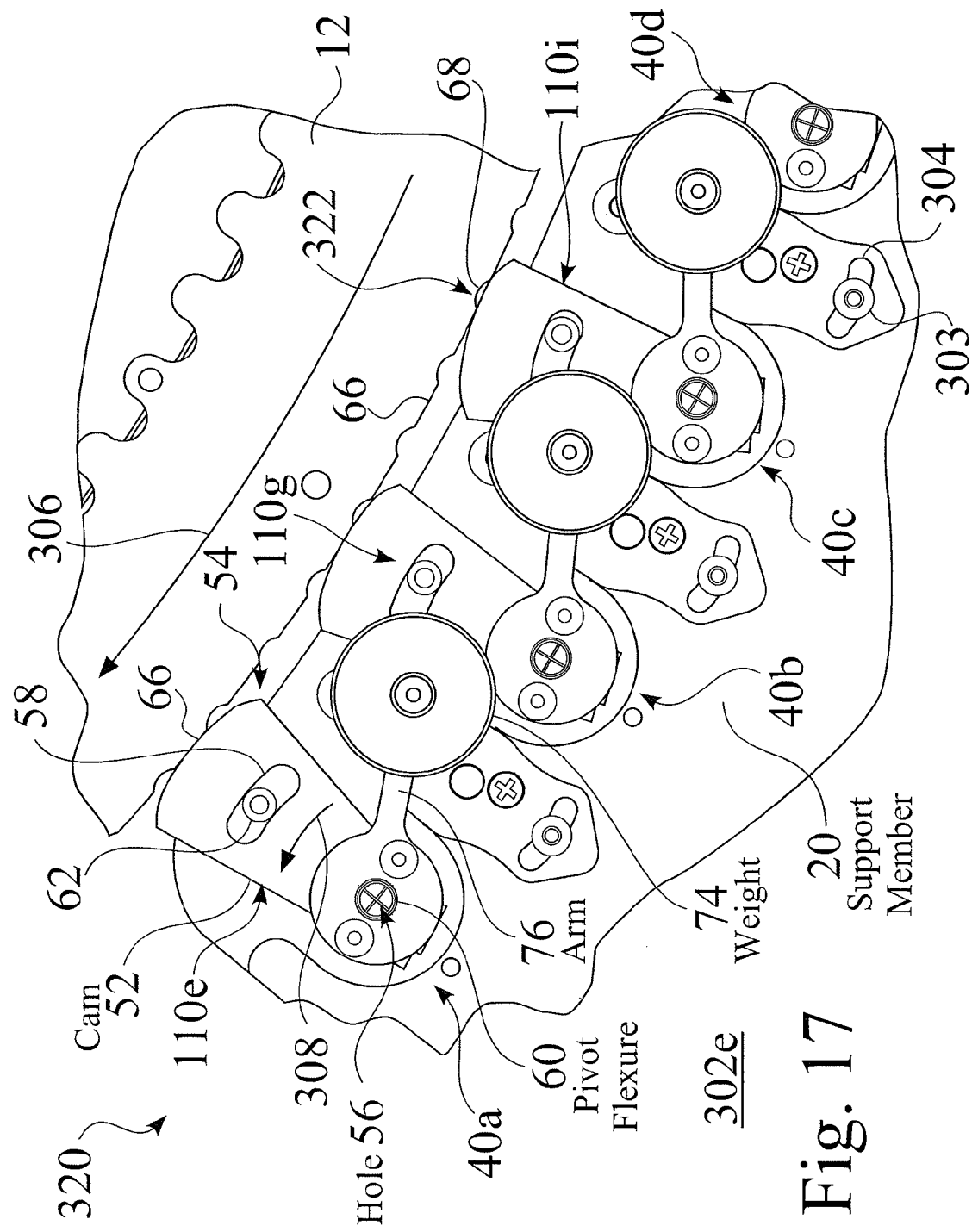
FIG. 17 is a partial view of an exemplary walking bearing system in a third sequential position.
Figure 18:
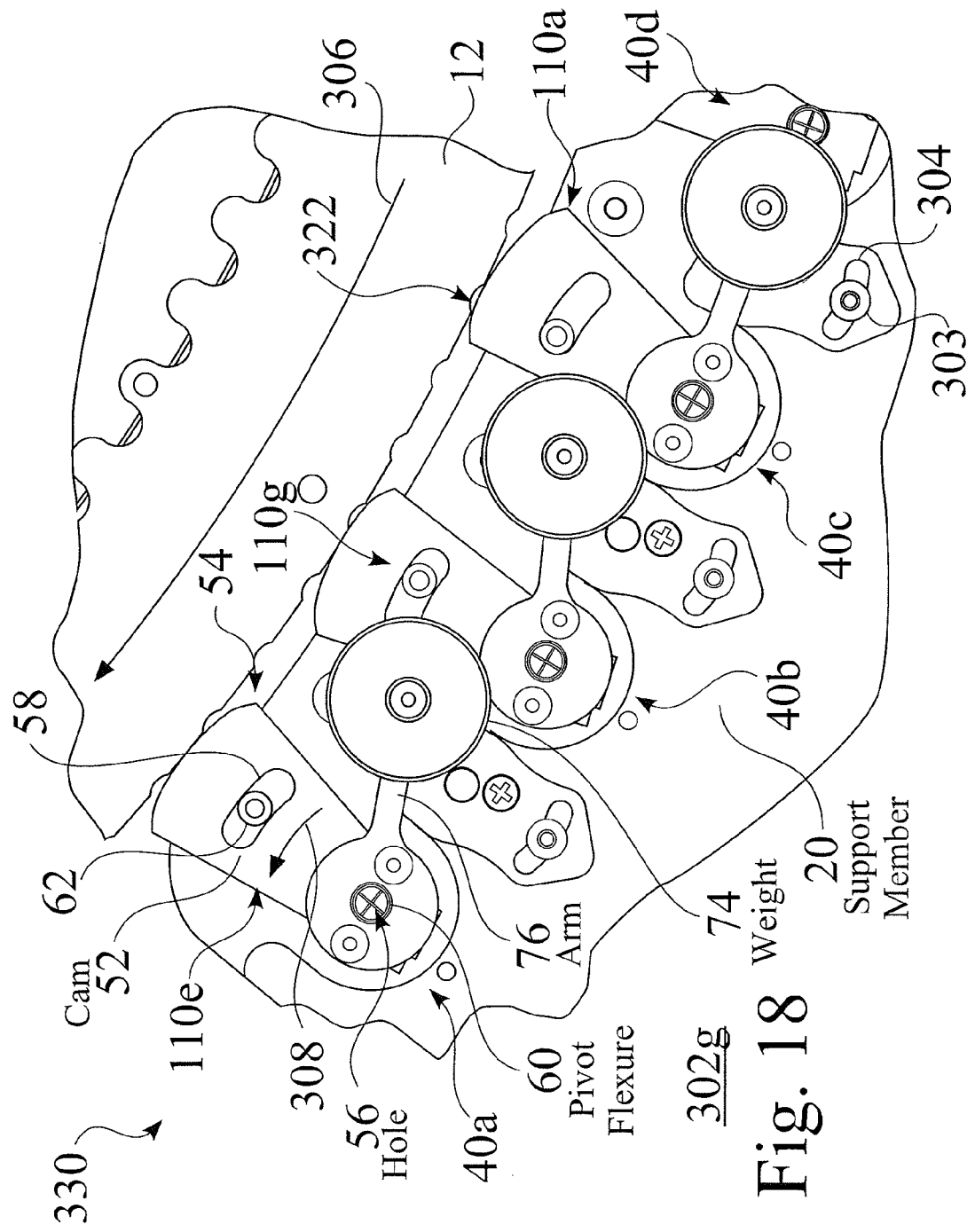
FIG. 18 is a partial view of an exemplary walking bearing system in a fourth sequential position.
Figure 19:
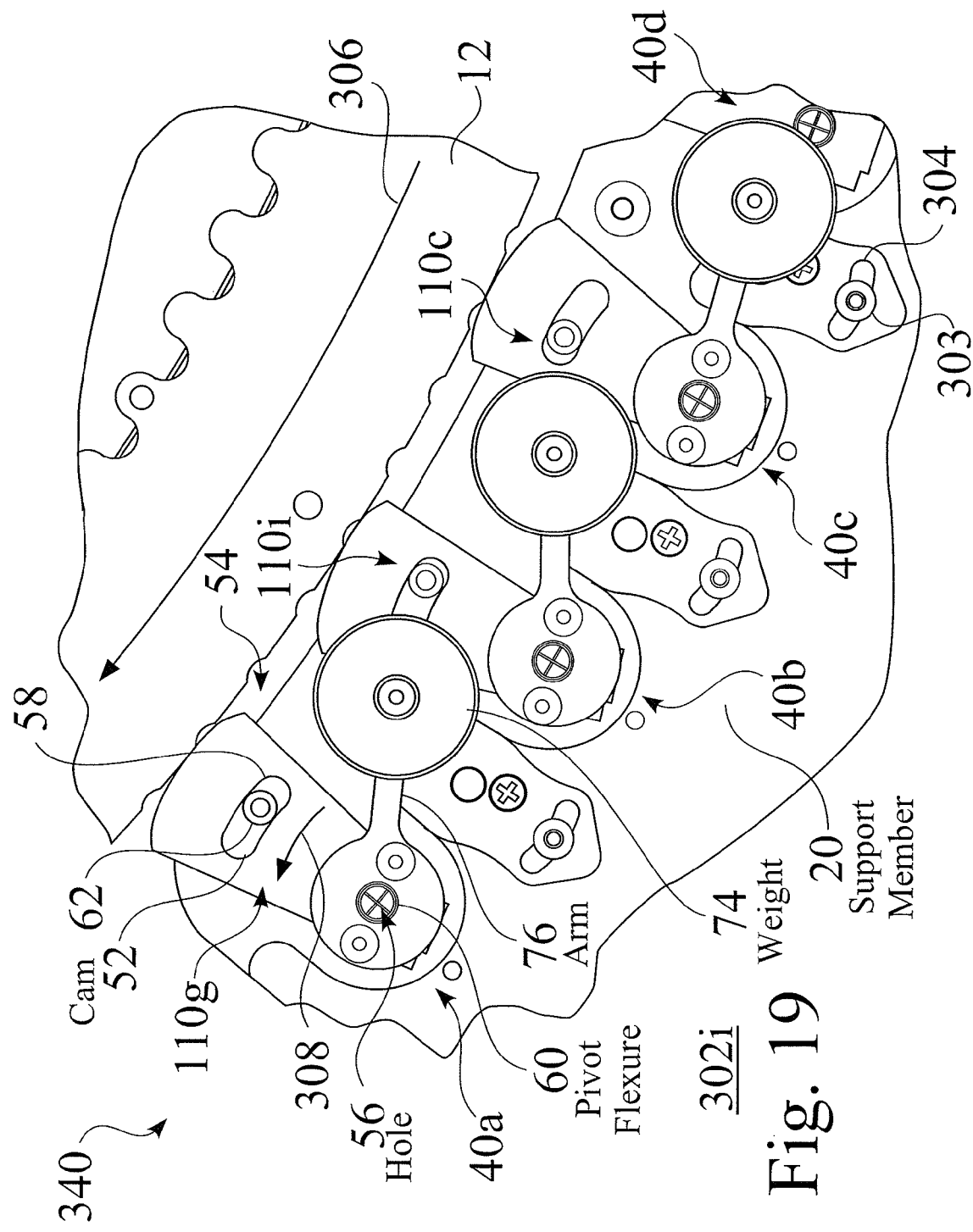
FIG. 19 is a partial view of an exemplary walking bearing system in a fifth sequential position.
Figure 20:
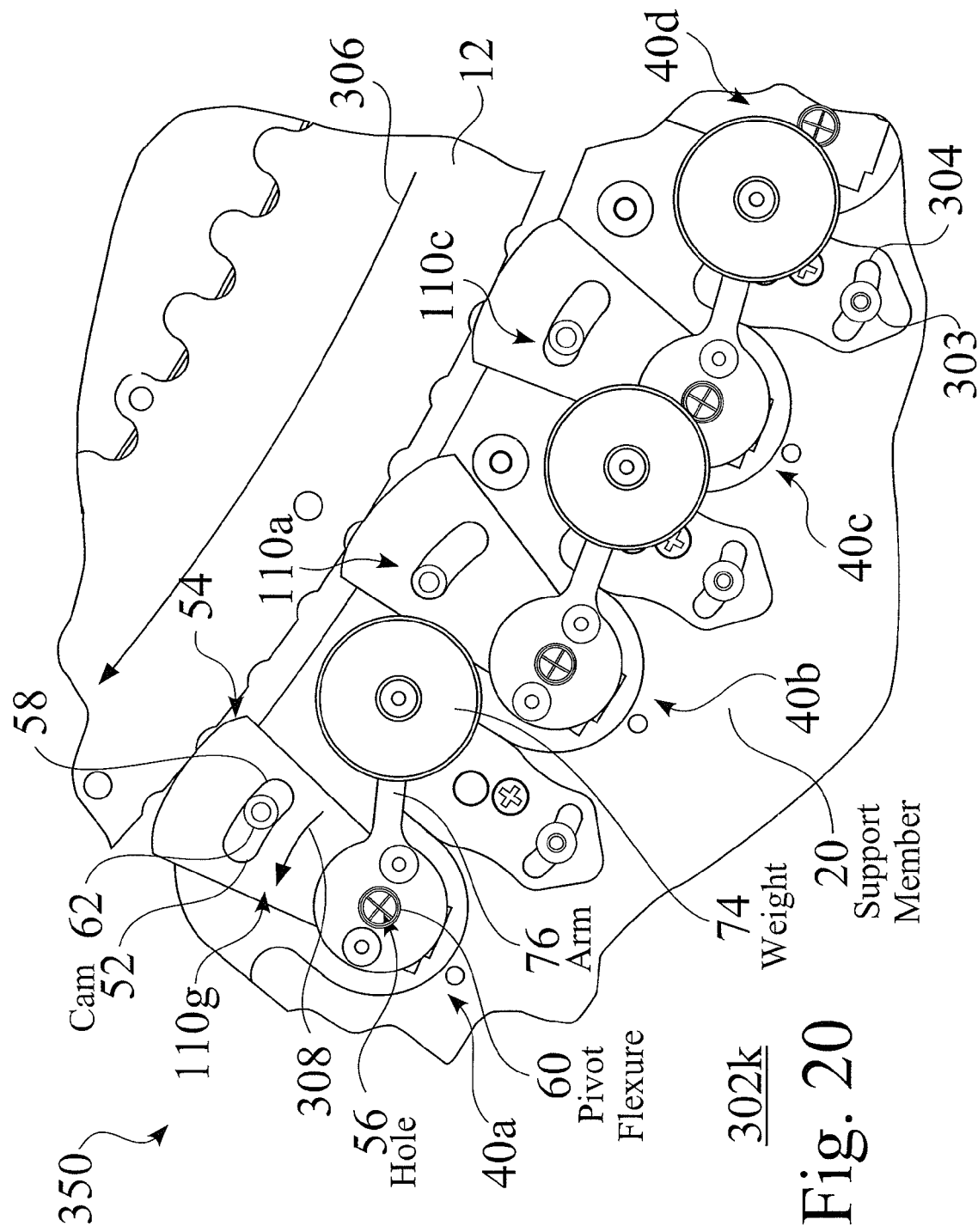
FIG. 20 is a partial view of an exemplary walking bearing system in a sixth sequential position.

For example, FIG. 15 is a partial detailed view 300 of an exemplary walking bearing system 10 in a first sequential position 302a. FIG. 16 is a partial detailed view of an exemplary walking bearing system 10 in a second sequential position 302c. FIG. 17 is a partial detailed view of an exemplary walking bearing system in a third sequential position 302e. FIG. 18 is a partial detailed view of an exemplary walking bearing system in a fourth sequential position 302g. FIG. 19 is a partial detailed view of an exemplary walking bearing system in a fifth sequential position 302i. FIG. 20 is a partial detailed view of an exemplary walking bearing system in a sixth sequential position 302k.

As seen in FIG. 15, the cam cascade 30 comprises a plurality of walking bearing assemblies 40, e.g. 40a-40z. In the exemplary structure shown in FIG. 15, each of the walking bearing assemblies 40 further comprises a counterweight 74 that extends 77 from a cam arm 76 that is affixed 72 to a corresponding cam 52. The counterweights 74 and their positions, as defined by the cam arms 76 and movement, may preferably provide restorative force 75 and torque 82, such as alone or in combination with bias force 122, to direct the cams 52 toward a respective home position 110b.

The center of each cams 52 is rotatable about a pivot point 56, wherein the cams 52 are mounted to corresponding pivot flexures 60, which in the exemplary embodiment 10 preferably comprise a pivot bearing flexure 60, such as available through C-Flex Bearing Co., Inc., of Frankfort, N.Y. Pivot flexures 60 provide rotation as well as spring bias within an integrated assembly having non-contact parts, wherein the spring bias is supplied by torsional bias members 118 (FIG. 4) between opposing halves 114,116. As well, many components of the walking bearing assemblies 40 may preferably be cantilevered out across the length 156 (FIG. 6, FIG. 9) of the pivot flexures 60. In alternate embodiments of the walking bearing system 10, structure 30,40 and process, the flexures 60 may alternately comprise butterfly flexures 60 or helical flexures 60.

The exemplary structure shown in FIG. 15 also comprises a cam limit means to define a home position 110a for each of the cams 52, such as but not limited to a cam limit slot 58 defined through each of the cams 52, and corresponding limit stops 62, such as but not limited to a screw head 62, affixed to the support member 20.

The cam limiter mechanism 58,62 limits the rotational range of the cam 52, such as to prevent the movement of the cam 52 from causing mechanical contact between the end stops 119 (FIG. 4, FIG. 5) of the pivot flexure itself 60. For example, as the cam 52 rotates toward a home position 110a, the limit stop 62 contacts the edge of the limiter 58 of the cam 52, before the cam 52 can rotate to a further angle at which a fixed member 114 and a rotatable member 116 would contact each other.

The bolt 62 inside the limiter 58 is not typically required to carry any of the load, as the limiter may only be used to limit the range of motion 122. Some embodiments of the cam assemblies 40 do not require the limiters 58,62, such as for assemblies 40 that are self-limiting.

In the exemplary structure shown in FIG. 15, the pivot flexures 60 are not continuously rotatable. Instead, the pivot flexures 60 have a range 122 of rotational motion, typically either direction from a center point of rotation, which may preferably coincide with the home position 110a of an affixed cam 52. While pivot bearings 60 may typically have a range of 30 degrees in either direction, some exemplary system embodiments 10 limit the rotational motion to 20 degrees, in one direction, away from a home position 110a.

As the rotational element 12 rotates, the cams 52 follow in rotation 122 while the cam face 54 contacts a corresponding bearing surface 66 on the rotational element 12, until the point of contact between the cam 52 and rotational element 12 approaches a relief region 68, wherein contact between the cam 52 and rotational element 12 is broken. At this time, the cams 52 are not confined to rotate 122 further by the rotational element 12, and are acted upon by the bias force 124, such as provided by the pivot flexure 60, and/or by the induced torque 82 provided by the cam weight 74 and cam arm 76, wherein the cams 52 return toward their zero, i.e. home position 110a.

Therefore, the cams 52 are freed up when they rotate to point corresponding to one of the reliefs 68 in the rotational element 12, at which time that the particular cam 52 is unloaded and is free to move in response to bias means associated with the corresponding walking cam assembly 40.

In the exemplary structure 10 shown in FIGS. 15-20, each of the cams 52 in a walking bearing cascade 30 are not evenly spaced in relation to the circumferential distance between reliefs 68 on the rotational element 12. The cams 52 may be positionally phased in position across the range of space of the support member 20 that extends about the circumference of the rotational member 12. Therefore, at any given time, a series of the cams, i.e. one or more but not all, snap back 124 toward their home position 110a, while at least two of the cams 52 carry the load.

As seen in FIG. 15 through FIG. 20, the relative position of each of the cams 52 in relation to their travel may be seen from the relative position of the limit stops 62 within their corresponding slots 58. For example, as seen in FIG. 15, the cam 52 associated with a first walking bearing assembly 40a is shown in a home position 110a, while a cam 52 associated with a second walking bearing assembly 40b is shown in a further rotated position 110c, and a 52 associated with a third walking bearing assembly 40c is shown in a third position 110e. The positions of the cams 52 are offset from each other, such that only a portion of the cams 52, i.e. one or more members of the cascade 30, rotationally arrive at a return detent 68 at any given point in the relative movement between the rotational element 12 and the bearing cascade 30.

The exemplary embodiment shown in FIG. 1 and FIGS. 15-20 has a first set 30, e.g. 30a, of walking bearings 40, e.g. 40a-40z on the front side 262a (FIG. 12) of the support member 20, and a second set 30, e.g. 30b, of walking bearings 40, e.g. 40a-40z on the opposite, i.e. back side 262b of the support member 20.

As seen in FIG. 15, the cross-pivot flexors 60 that are located between the cams 52 on the first surface correspond to cams 52 that are part of the second bearing array 30, e.g. 30b that is located on the opposing surface 262b of the support member 20.

In alternate embodiments 10, the walking bearing system 10 may preferably comprise several cascades 30, e.g. rows 30 of walking bearing assemblies 40, which may preferably be out of phase with each other, such as to stabilize a light rotational element 12.

During the course of moving the rotational element 12, some cams 52 are engaged with the extended surface 14 of the wheel. For example, at a point in time, some of the cams 52 are already engaged with the rotational element 12, and some of them will be disengaging, and some will be disengaged, wherein the disengagement provides the reset for each of the cam assemblies 40.

As seen in FIG. 15 through FIG. 20, the shape of the surface of the wheel 12 has spaced grooves or indentations 68 defined upon the outer surface 14 of the circular member 18, while the cams 52 provide a profile 102 that can rotate back to a first position 110a when the surface 56 of the cam 52 is located within the relief area 68. As the rotational element 12 rotates, some of the cams 52 come up to a groove 68, and at that point they are released 124.

The exemplary embodiment of the bearing assemblies 40 shown in FIG. 15 through FIG. 20 further comprises means for adjusting the mounting location for each of the cams 52, such as but not limited to a cam mount adjustment screw 303 and banana slot 304 (FIG. 15) that are associated with the pivot bearing mount 264. While the pivot bearing mounts 264 seen in FIG. 15 are associated with a similar bearing cascade 30 on the opposite surface 262b of the support member 20, a similar series of bearing mounts 264 are located on the opposing surface 262b that are associated with the illustrated bearing cascade 30 on the first surface 262a.

The adjustment means 303,304 in the exemplary embodiment 10 allows each cam 52 to be adjustably mounted, so that each cam 52 can be accurately positioned to contact the rotational element 12, such as to compensate for machining tolerances in the embodiment shown. Therefore, the mounting location of each cam 52 may preferably be tuned through the adjustment means 303,304, such that each cam 52 accurately contacts the rotating element 12, making the assembly a robust design.

Some embodiments of the bearing assembly 10 comprise preferred materials and/or coating and/or plating layers for either the bearing cams 52 and/or the mating bearing surface 66 of the rotational element 12. For example, since many preferred embodiments of the walking bearing system 10 are specifically suited for extremely slow movement over extremely long durations, the materials, coating layers, and/or plating layers for the bearing cams 52 and/or the mating bearing surfaces 66 of the rotating element 12 may be chosen to operate in such an operating environment.

While basic embodiments of the walking bearing system 10 are not required to be comprised of materials, coating layers, and/or plating layers, the composition of some components within some system embodiments alleviate microwelding, such as between the cams 52 and the rotational element 12. For example, for embodiments of the walking bearing system 10 that are subjected to extremely slow movement over extremely long durations, wherein galvanic corrosion and metal to metal welding may otherwise commonly occur if conventional materials were chosen, an exemplary system embodiment may include either a rotational element 12 or cams 52 comprised of ceramic or stone, or having a ceramic plating layer defined on at least one mating surface of either the rotational element 12 or cams 52.

Therefore, in some embodiments 10, the rotational element 12 comprises a hard stone, such as but not limited to nephrite jade. As well, the cams 52 may comprise a hard metal, and/or may further comprise one or more coating or plating layers, e.g. such as but not limited to titanium nitride, established on one or more surfaces, e.g. the contact surfaces 66.

In contrast to conventional bearing systems, which purposely avoid friction between components, many components within the walking bearing system 10 preferably provide increased levels of friction, such as between the cam face 54 of the cams 52 and the bearing regions 66 of the rotational element 12. For example, as seen in FIG. 15, the cam face 54 of the cams 52 and the bearing regions 66 of the rotational element 12 may preferably provide an interface having a high level of friction, wherein the components, which may comprise similar materials, do not bind up, and wherein the load is broadly distributed across all the bearing cams 52.

Some embodiments of the walking bearing system 10 may comprise any of a plurality of cascades 30, and/or a large number of walking bearing assemblies 40 within one or more cascades 30, such as to provide a large number of cams 52, so there is very little weight that is carried on each one of cams 52.

Each of the exemplary cams 52 seen in FIGS. 15 through FIG. 20 is mounted to a pivot flexure 60, as described above, wherein the pivot flexures 60 are rotatable about an axis 56, and provide a spring bias 124 toward a home position 110a. In some embodiments, 10, the pivot flexures 60 comprise spring steel. In other embodiments, such as for long-duration applications, the pivot flexures 60 may preferably comprise spring steel titanium, or another other long-lasting material or alloy thereof.

While pivot flexures 60 may preferably provide spring bias 124 in the exemplary embodiment 10 shown in FIG. 15 through FIG. 20, other flexure elements 60 may alternately be used for such purposes, such as but not limited to pivot or bearing mounts 60 and separate bias components, e.g. springs, or other pivot, flexure, or bearing structures that provide integrated bias means, such as but not limited to butterfly flexures or helical flexures.

In each of the exemplary cam assemblies 40 seen in FIG. 15 through FIG. 20, the torsion of the cross-flexor pivot flexures 60, in combination with the weights 74, provides the necessary bias force 124, torque 82, and/or rotational momentum to return the cams 52 to their home position 110a.

In some embodiments that use pivot flexures 60, during a reset 124, torsion on the pivot flexures 60 brings the cams 60 roughly to center, while the weights 74 bring the cams 52 past center and all the way over to near the other side of the operational range of the pivot flexures 60, to reset the cams 52 in their home positions 110a. Therefore, in some embodiments of the walking bearing assemblies 40, the counterweights 74 help the spring pivot flexures 60 use more of the operational range of motion 122.

For example, an exemplary pivot flexure 60 may have a total inherent range of twenty degrees, i.e. ten degrees of clockwise or counterclockwise rotation away from an unbiased central position. While such an exemplary pivot flexure 60 may separately provide only ten degrees of motion back to an unbiased position from either side, the use of additional torque 82, such as provided from a counterweight 74, may preferably be used to increase the usable range of motion 122 of the pivot flexure 60, past center and toward the other end of rotation, e.g. using up to a full twenty degrees for the exemplary pivot flexure 60 noted above.

As seen in FIG. 15, each of the three cams 52 associated with walking bearing assemblies 40a, 40b, and 40c are in contact with bearing support regions 66 of the rotational element 12, while the rotational element turns 306 in a clockwise direction. While the rotational element turns 306, the cam 52 corresponding to the first walking bearing assembly 40a is in a first home, i.e. beginning position 110a, typically as a result of a recent clockwise reset 124. As the rotational element 12 rotates 306 further, the cam 52 is engaged with the bearing surface 66 of the rotational element 12, wherein the cam 52 rotates counterclockwise 308 through the range of motion, which also rotates and raises the attached arm 76 and weight 74.

As seen in the subsequent view 310 in FIG. 16, each of the three cams 52 associated with walking bearing assemblies 40a, 40b, and 40c have remained in contact with bearing support regions 66 of the rotational element 12, while the rotational element turns 306 in a clockwise direction. As the rotational element turns 306, the cams 52 corresponding to the walking bearing assemblies 40a, 40b, and 40c have continued to rotate counterclockwise 308 to advance to respective positions 110c, 110e and 110g, which also rotate and raise the attached arms 76 and weights 74.

As seen in the next subsequent view 320 in FIG. 17, each of the three cams 52 associated with walking bearing assemblies 40a, 40b, and 40c have remained in contact with bearing support regions 66 of the rotational element 12, while the rotational element has continued to turn 306 in a clockwise direction. As the rotational element turns 306, the cams 52 corresponding to the walking bearing assemblies 40a, 40b, and 40c have continued to rotate counterclockwise 308 to advance to respective positions 110e, 110g and 110i, which also rotate and raise the attached arms 76 and weights 74.

However, as further seen in FIG. 17, the relative rotation between the cam 52 associated with the third walking bearing assembly 40c and the rotational element 12 has advanced to a point wherein the cam face 54 is just approaching one of the reliefs 68 in the rotational element 12, at which point the cam 52 associated with the third walking bearing assembly 40c is released. Therefore, as shown in the next subsequent view 330 in FIG. 18, the cam 52 returns to a reset, i.e. home, position 110a, by action of the rotational bias force 124 provided by the pivot flexure 60 and/or by the torque 82 applied by the associated arm 76 and weight 74. During this reset of the cam 52 associated with the third walking bearing assembly 40c, the rotational structure 12 remains in contact with and is supported by the cams 52 associated with the first and second walking bearing assemblies 40a,40b, and also typically by other cams 52 within a walking bearing cascade 30 (FIG. 1).

As seen in the next subsequent view 340 in FIG. 19, each of the three cams 52 associated with walking bearing assemblies 40a, 40b, and 40c have again retained contact with bearing support regions 66 of the rotational element 12, while the rotational element has continued to turn 306 in a clockwise direction. As the rotational element turns 306, the cams 52 corresponding to the walking bearing assemblies 40a, 40b, and 40c have continued to rotate counterclockwise 308 to advance to respective positions 110g, 110i and 110c, which also rotate and raise the attached arms 76 and weights 74.

However, as further seen in FIG. 19, the relative rotation between the cam 52 associated with the second walking bearing assembly 40b and the rotational element 12 has advanced to a point wherein the cam face 54 is just approaching one of the reliefs 68 in the rotational element 12, at which point the cam 52 associated with the second walking bearing assembly 40b is released. Therefore, as shown in the next subsequent view 350 in FIG. 20, the cam 52 returns to a reset, i.e. home, position 110a, by action of the rotational bias force provided by the pivot bearing 60 and/or by the torque 82 applied by the associated arm 76 and weight 74.

As described above, the cam assemblies 40, e.g. 40a-40z, within a walking bearing cascade 30 may preferably be arranged in a phased manner in relation to each other and to a specific rotational element 12 having spaced relief regions 68, which may typically be equally spaced from each other around the circumference of the rotation element 12. Therefore, while the pattern of the reliefs 68 on the rotational element 12 is typically regular, the cams assemblies 40 may preferably be arranged in a phased manner, such as to share of the weight of the rotational element 12, wherein the cams 52 may not be equally spaced from each other. For example, the cams assemblies 40 may preferably be arranged based on a sine function.

The cams 52 each provide a surface 54 that meets with the rotational element 12, e.g. drive wheel. The central profile 104 (FIG. 4) of the cams 52 comprises a circular arc, i.e. having a defined radius 112. Once the cams 52 snap back to their home position 110a, the cams 52 typically stop in a free floating state, until the rotational element 12 is rotated beyond the detent 68, wherein contact is made once again between the cam 52 and a bearing region 66 of the ring surface 14.

The transition between the bearing regions 66 and the defined reliefs 68 of the rotational element 12 may typically have a lead in region, such as to ensure that the transitions do not have sharp edges or burrs that could get caught. The specific profile that the reliefs 68 define may be any of a wide variety of shapes, such as but not limited to being based upon available manufacturing or fabrication methods for the rotational element 12.

In the exemplary embodiment of the walking bearing assemblies 40 seen in FIG. 2 and FIG. 3, the counterweights 74 extend from the central axis 56 of the cam 52, such as by an arm 76. The arm 76 is affixed to any of the cam 52 or the pivot bearing 60, such as by but not limited to one or more fasteners 78. Alternate embodiments of the walking bearing assemblies are not require to have fasteners 78 and/or separate arms and weights. For example, some alternate embodiments of the cams 52 may preferably be counterweighted, such that the counterweight 74 is not required to be a separate item.

In the exemplary embodiment shown, each of the cams 52 are fixedly attached to a corresponding pivot flexure 60, such as by but not limited to a clamp, i.e. pinch connection 268. As seen in FIG. 12, a hole and/or slot may be defined in the cam 52, while a screw 268 clamps, i.e. pinches the cam 52 onto the shaft of the pivot flexure 60.

While prior art bearing solutions typically comprise a plurality of rotational bearing elements, e.g. balls, cylinders or tapered, e.g. Timken™, bearings, such as between a rotational element and a race, with the addition of a lubricant or grease, such approaches have several shortcomings for many design environments, such as for systems having high loads and very low-speeds of relative movement between components.

In such an environment, conventional bearings may weld themselves shut, or wear grooves or divots at points of contact if they don't move for a long time, just from sitting, and/or from deflecting or micro-vibrations in the mounts and the bearing elements, such as from nearby movement, e.g. people walking nearby, or trucks going by.

This is a common problem where, unless a bearing is exercised regularly and at least is turning on the order of a revolution a day, a conventional bearing may push all the grease out from the pairs of contact points around the race, and the bearing interface and wears a divot, and/or, if it's made of metal(s), such a bearing may even weld itself shut.

In contrast to such conventional bearing systems, the walking bearing system 10 and related structure 40 provides an improved, robust bearing structure for many design environments, such as for systems having high loads and/or very low-speeds of relative movement between components.

Component Service and Replacement. The walking bearing system 10 inherently allows service and or replacement of walking bearings 40, without taking the assembly 10 out of service. For example, since the load is spread between a large plurality of bearing assemblies 40, one or more of the cams 52 may typically be taken out and replaced, since there are typically a large number of the cams 52 are share the load of the rotational element 12.

In contrast to conventional closed bearings, the walking bearing system 10 is highly serviceable, and the structure 10 inherently provides access for observation and troubleshooting, since there are no hidden parts or interfaces.

Figure 21:
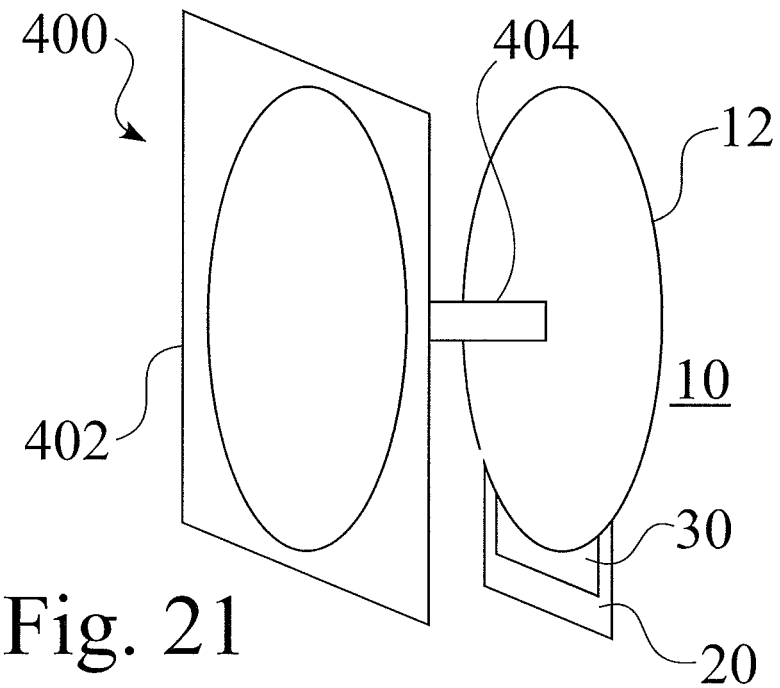
FIG. 21 is a schematic view of an exemplary walking bearing system associated with a clock.

Applications and Alternate Embodiments. FIG. 21 is a schematic view 400 of an exemplary walking bearing system 10 associated or otherwise linked 404 with a clock 402, wherein the clock 402 has extreme design limitations, for which the walking bearing system 10 provides a suitable robust bearing structure. In one exemplary embodiment, the rotational element 12 for such a clock 400 comprises stone, approximately 20 feet in outer diameter, and is designed to rotate thirty one times in ten thousand years. In such an environment, the rotational element 12 moves very slowly in relation to the support structure 20, e.g. moving only a few inches in surface speed per year.

As the total design life for such an exemplary clock 402 may be on the order of thirty one revolutions, the walking bearing structure 10 easily provides a robust design that can meet or exceed the life of the balance of the assembly, even with contamination and/or wear.

For example, even if dust enters the components, the bearing assemblies 40 can still function well. As well, since there are typically a plurality of walking bearing assemblies 40 within a cascade 30, if some are adjusted well and some are adjusted poorly, the system 10 and clock 402 still function as designed.

Figure 22:
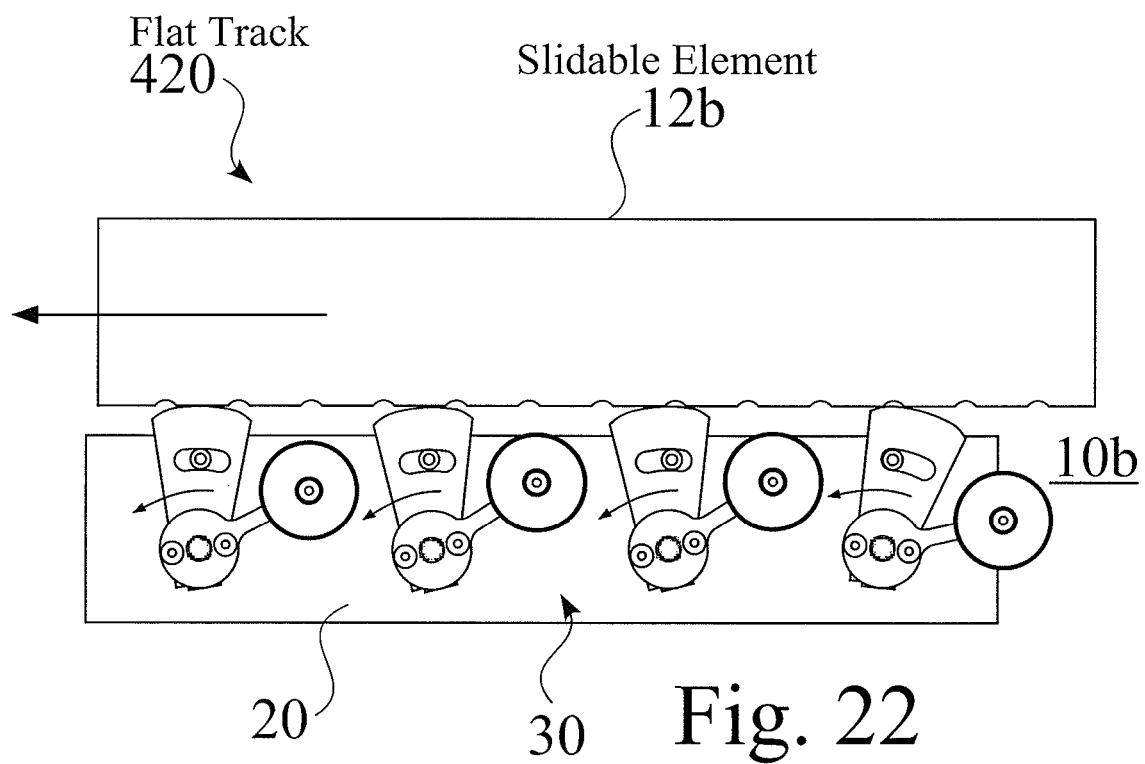
FIG. 22 is simplified schematic view of an exemplary walking bearing system for a planar bearing interface.
Figure 23:
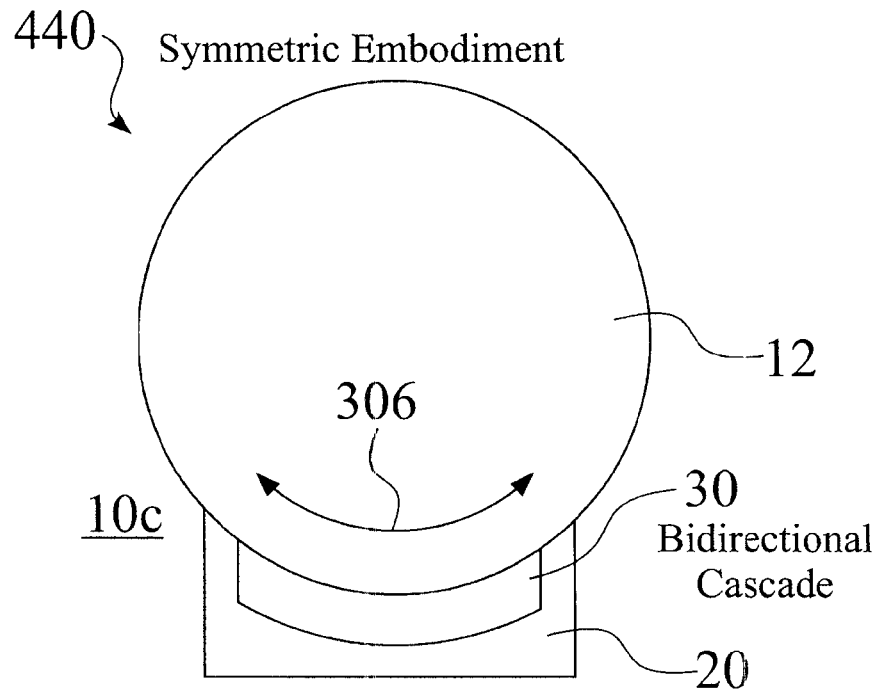
FIG. 23 is simplified schematic view of an exemplary walking bearing system for symmetric movement.
Figure 24:
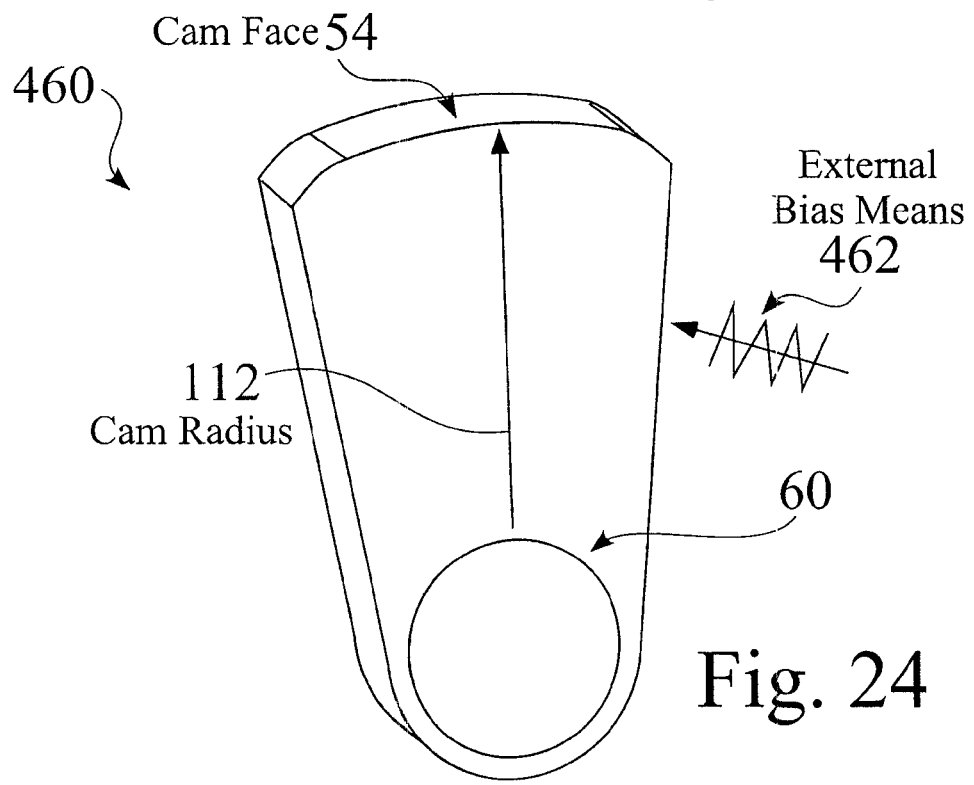
FIG. 24 show different bias means for walking bearing systems.

FIG. 22 is simplified schematic view 420 of an exemplary walking bearing system 10b for a planar bearing interface 12b, such as comprising a slidable element 12b. FIG. 23 is simplified schematic view 440 of an exemplary walking bearing system 10c for symmetric movement 306. FIG. 24 shows an external bias means 460 for walking bearing systems 40, e.g. such as independent from a bias provided by a flexure 60.

Figure 25:
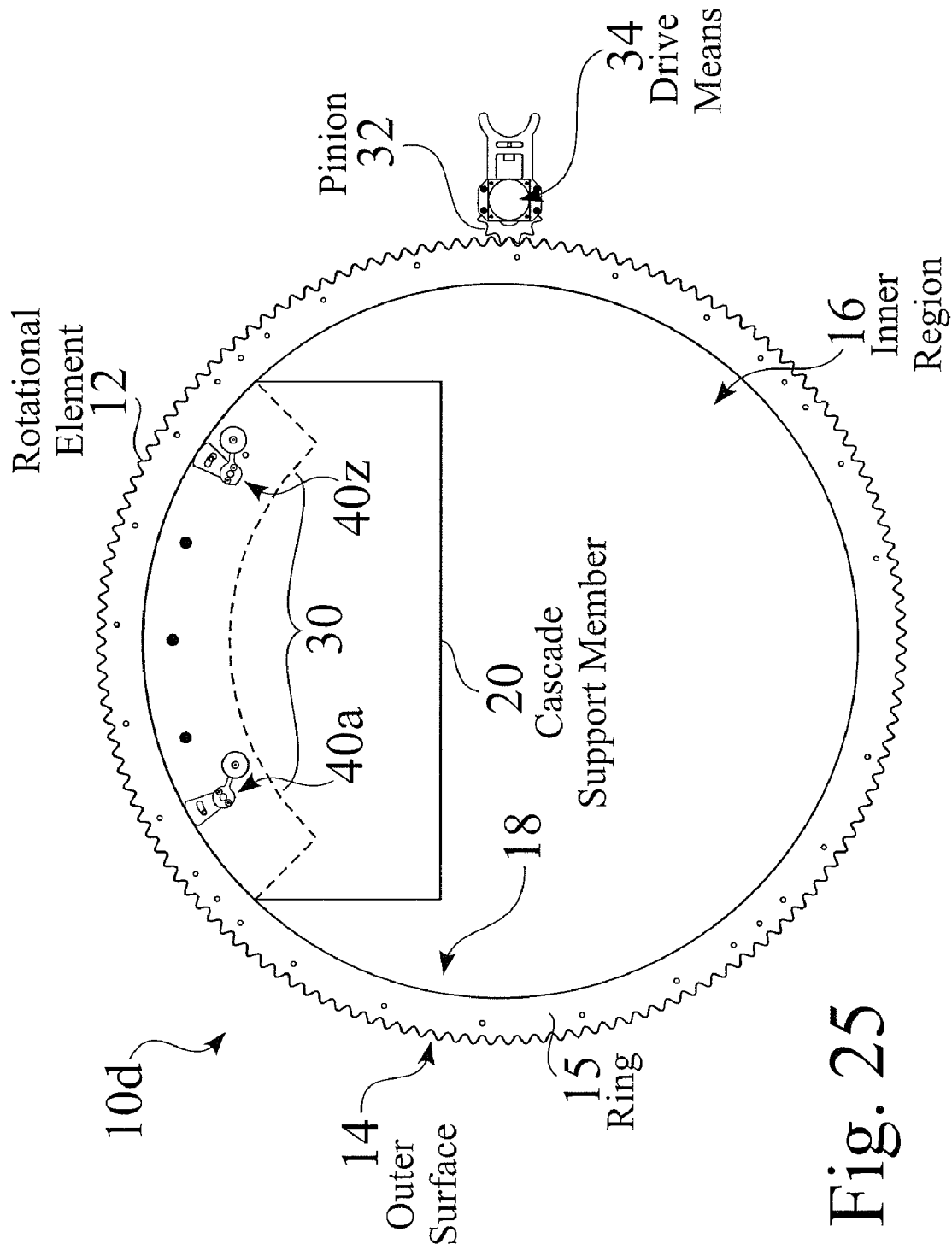
FIG. 25 is a front side view of an alternate exemplary ring structure supported by an exemplary walking bearing system.

FIG. 25 is a front side view of an alternate exemplary ring structure supported by an exemplary walking bearing system 10d, wherein a rotational element 12 has an inner ring surface 14, similarly comprising bearing regions 66 and relief regions 68, and wherein a walking bearing cascade 30 mounted on a support member 20 provides support for the rotational element 12 through the inner ring surface 14. As well, the rotational element further comprises a ring gear defined upon the outer surface 14, wherein the rotational element 12 is rotatable 306, such as but not limited to a drive means 34 and a pinion gear 32.

In alternate embodiments 10, e.g. 10b,10c,10d, pins or other details may preferably be located on the outside of the cam 52, to similarly limit the range of the cam 52. As well, the use of limiters 58,62 and/or 303,304 is not essential to the bearing structure 40. While some pivots or flexures 60 may comprise internal limiters, some system embodiments provide additional limiters, such as to promote durability for the pivots or flexures 60.

In the exemplary embodiment of the bearing assemblies 40 shown in FIG. 2 and FIG. 3, a screw or bolt 62 sets the bearing cam 52 in the correct start position 110a, wherein a limiter bolt head 62 in the exemplary embodiment limits the travel of the bearing cam 52, and also sets the home position 110a.

A significant advantage of many embodiments of the exemplary walking bearing system 10 is that pivot flexures 60 do not require lubrication. As well, the bearing surfaces 54 of the cams 52, as well as the bearing regions 66 of the rotational element 12, similarly do not require lubrication, since friction between the cams 52 and the rotational element 12 is typically desirable, as friction promoted proper movement of the cams 52 throughout their periodic "walking" motion.

While the exemplary embodiment shown in the figures comprises two cascades 30a,30b of cams 52 and a circular element 12 having reliefs 68, other embodiments may preferably be used, such as comprising more notches and more cams, or fewer notches, fewer cams, as desired.

While some embodiments of the structures and methods disclosed herein are implemented for a slowly rotating structure, the structures and methods may alternately be used for a wide variety of bearing structures between components, such as for stationary or mobile structures, over a wide variety of operating conditions.

As well, while some embodiments of the structures and methods disclosed herein are implemented with a pivot bearings, other embodiments may employ other pivots or bearings for rotational movement of the cams, such as in combination with other disclosed cam assembly structures.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A bearing structure, comprising:
 a rotational element having a generally cylindrical bearing surface, and a plurality of detents defined upon and extending in from the cylindrical bearing surface, wherein the generally cylindrical bearing surface comprises a plurality of bearing regions and a plurality of detent regions;
 a support member;
 at least three bearing assemblies, wherein each of the bearing assemblies comprises
 a cam member rotatably mounted to the support member, each of the cam members comprising a cam surface having a profile that contacts the cylindrical bearing surface and rotates away from a home position when the cam is rotatably positioned to meet one of the bearing regions of the cylindrical bearing surface, and does not contact the cylindrical bearing surface when the cam is rotatably positioned to meet one of the detent regions of the cylindrical bearing surface, and
 means for rotationally biasing the cam member toward the home position; and
 means for rotating the rotational element in relation to the support member.

2. The bearing structure of claim 1, further comprising:
 a pivot associated with each of the bearing assemblies, wherein the pivots are affixed to the support member, and wherein the cam members are rotationally mounted to the support member by the pivots.

3. The bearing structure of claim 2, wherein each of the pivots comprise flexures having at least one torsional element that extends between a first member and a second member, wherein the first member is affixed to the support member, and wherein the second member is affixed to the cam member.

4. The bearing structure of claim 3, wherein any of the torsional element, the first member and the second member of the flexures comprise any of spring steel, titanium, or any alloy thereof.

5. The bearing structure of claim 1, wherein the rotating member comprises stone.

6. The bearing structure of claim 1, wherein the rotating member comprises nephrite jade.

7. The bearing structure of claim 1, further comprising:
 means for limiting a home position of each of the cams.

8. The bearing structure of claim 1, further comprising:
 means for mounting each of the cams on the support structure at a set distance from the rotational element.

9. The bearing structure of claim 1, further comprising:
 a weight mounted to or integral with each of the cam members.

10. The bearing structure of claim 1, further comprising:
 means for rotating the rotational element with respect to the support member.

11. The bearing structure of claim 10, wherein the rotational element further comprises a ring gear, and wherein the means for rotating the rotational element comprises a drive gear that is engageable with the ring gear.

12. A bearing assembly, comprising:
 a cam member rotatably mountable to a support member, the cam member comprising a cam surface having a profile that contacts a bearing surface of an external rotational element, wherein the cam member rotates away from a home position when the cam is rotatably positioned to meet a bearing region of the bearing surface of the external rotational element, and does not contact the bearing surface when the cam is rotatably positioned to meet a detent region defined and extending into the bearing surface of the external rotational element, and means for rotating the rotational element in relation to the support member; and means for rotationally biasing the cam member toward the home position.

13. The bearing assembly of claim 12, further comprising:

a pivot associated with the bearing assembly, wherein the pivot is affixed to the support member, and wherein the cam member is rotationally mounted to the support member by the pivot.

14. The bearing assembly of claim 13, wherein pivot comprises a flexure having at least one torsional element that extends between a first member and a second member, wherein the first member is affixed to the support member, and wherein the second member is affixed to the cam member.

15. The bearing assembly of claim 14, wherein any of the torsional element, the first member and the second member of the flexure comprises any of spring steel, titanium, or any alloy thereof.

16. The bearing assembly of claim 12, wherein the rotational element comprises stone.

17. The bearing assembly of claim 12, wherein the rotational element comprises nephrite jade.

18. The bearing assembly of claim 12, further comprising: means for limiting a home position of the cam member.

19. The bearing assembly of claim 12, further comprising: means for mounting the cam member on the support member at a set distance from the rotational element.

20. The bearing assembly of claim 12, further comprising: a weight mounted to or integral with the cam member.

21. The bearing assembly of claim 12, further comprising: means for rotating the rotational element with respect to the support member.

22. The bearing assembly of claim 21, wherein the rotational element further comprises a ring gear, and wherein the means for rotating the rotational element comprises a drive gear that is engageable with the ring gear.

23. A walking bearing cascade that is mountable to a support member for supporting a rotational element having a generally cylindrical bearing surface, and a plurality of detents defined upon and extending in from the cylindrical bearing surface, wherein the generally cylindrical bearing surface comprises a plurality of bearing regions and a plurality of detent regions, the walking bearing cascade comprising:

at least three bearing assemblies, wherein each of the bearing assemblies comprises a cam member rotatably mounted to the support member, each of the cam members comprising a cam surface having a profile that contacts the cylindrical bearing surface and rotates away from a home position when the cam is rotatably positioned to meet one of the bearing regions of the cylindrical bearing surface, and does not contact the cylindrical bearing surface when the cam is rotatably positioned to meet one of the detent regions of the cylindrical bearing surface, and means for rotationally biasing the cam member toward the home position; and means for rotating the rotational element in relation to the support member.

24. The walking bearing cascade of claim 23, wherein the detent regions defined upon and extending in from the cylindrical bearing surface of the rotational member are equally spaced from each other by a first distance, and wherein the bearing assemblies are arranged in relation to each other by a one or more distances that are different than the first distance.

25. The walking bearing cascade of claim 23, wherein the bearing assemblies are arranged in relation to each other according to a sinusoidal function.

26. The walking bearing cascade of claim 23, further comprising:

a pivot associated with each of the bearing assemblies, wherein the pivots are affixed to the support member, and wherein the cam members are rotationally mounted to the support member by the pivots.

27. The walking bearing cascade of claim 26, wherein each of the pivots comprise flexures having at least one torsional element that extends between a first member and a second member, wherein the first member is affixed to the support member, and wherein the second member is affixed to the cam member.

28. A process, comprising the steps of:

providing a rotational element having a generally cylindrical bearing surface, and a plurality of detents defined upon and extending in from the cylindrical bearing surface, wherein the generally cylindrical bearing surface comprises a plurality of bearing regions and a plurality of detent regions; and mounting at least three bearing assemblies to a support member, wherein each of the bearing assemblies comprises a cam member rotatably mounted to the support member, each of the cam members comprising a cam surface having a profile that contacts the cylindrical bearing surface and rotates away from a home position when the cam is rotatably positioned to meet one of the bearing regions of the cylindrical bearing surface, and does not contact the cylindrical bearing surface when the cam is rotatably positioned to meet one of the detent regions of the cylindrical bearing surface, and means for rotationally biasing the cam member toward the home position; and rotating the rotational element in relation to the support member.

29. The process of claim 28, wherein each the cam members are rotationally mounted to the support member by pivots.

30. The process of claim 29, wherein each of the pivots comprise flexures having at least one torsional element that extends between a first member and a second member, wherein the first member is affixed to the support member, and wherein the second member is affixed to the cam member.

* * * * *